United States Patent
Tillery, Jr. et al.

(10) Patent No.: US 11,734,019 B2
(45) Date of Patent: *Aug. 22, 2023

(54) SYSTEM AND METHOD OF UTILIZING PLATFORM APPLICATIONS WITH INFORMATION HANDLING SYSTEMS

(71) Applicant: Dell Products L.P., Round Rock, TX (US)

(72) Inventors: Donald Richard Tillery, Jr., Murphy, TX (US); Brijesh Kumar Mishra, Murphy, TX (US); Justin Walter Johnson, Austin, TX (US); Dongli Wu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/559,100

(22) Filed: Dec. 22, 2021

(65) Prior Publication Data

US 2022/0113983 A1 Apr. 14, 2022

Related U.S. Application Data

(63) Continuation of application No. 16/906,126, filed on Jun. 19, 2020, now Pat. No. 11,237,839.

(51) Int. Cl.
*G06F 9/4401* (2018.01)
*G06F 9/54* (2006.01)

(52) U.S. Cl.
CPC .......... *G06F 9/4406* (2013.01); *G06F 9/4403* (2013.01); *G06F 9/4411* (2013.01); *G06F 9/544* (2013.01)

(58) Field of Classification Search
CPC .... G06F 9/4406; G06F 9/4403; G06F 9/4411; G06F 9/544
(Continued)

(56) References Cited

U.S. PATENT DOCUMENTS

| 5,134,580 A | 7/1992 | Bertram et al. |
| 5,187,792 A | 2/1993 | Dayan et al. |

(Continued)

FOREIGN PATENT DOCUMENTS

WO 2019/113686 A1 6/2019

OTHER PUBLICATIONS

"Windows Platform Binary Table (WPBT)" by Windows at <http://go.microsoft.com/fwlink/p/?LinkId=234840>, Jul. 9, 2015, 12 pages.
(Continued)

*Primary Examiner* — Paul R. Myers
(74) *Attorney, Agent, or Firm* — McDermott Will & Emery LLP

(57) ABSTRACT

In one or more embodiments, one or more systems, one or more methods, and/or one or more methods may: register a subroutine configured to store multiple addresses of a volatile memory medium VMM of an information handling system (IHS); for each IHS initialization executable/OS executable pair of multiple IHS initialization executable/OS executable pairs: retrieve, from a first non-volatile memory medium (NVMM), an IHS initialization executable of the IHS initialization executable/OS executable pair; copy, by the IHS initialization executable, an OS executable of the IHS initialization executable/OS executable pair from the first NVMM to the VMM; call, by the IHS initialization executable, the subroutine; store, by the subroutine, an address associated with the OS executable via a data structure stored by the VMM; and copy, by a first OS executable, the OS executable from the VMM to a second NVMM based at least on the address associated with the OS executable.

20 Claims, 13 Drawing Sheets

(58) Field of Classification Search
USPC .......................................................... 713/1–2
See application file for complete search history.

(56) References Cited

U.S. PATENT DOCUMENTS

| | | | |
|---|---|---|---|
| 5,715,456 A | 2/1998 | Bennett et al. | |
| 6,216,224 B1 | 4/2001 | Klein | |
| 6,330,667 B1 | 12/2001 | Klein | |
| 6,513,114 B1* | 1/2003 | Wu | G06F 9/4411 713/2 |
| 7,937,701 B2 | 5/2011 | Kinney et al. | |
| 8,316,248 B2 | 11/2012 | Yokota et al. | |
| 8,418,226 B2 | 4/2013 | Gardner | |
| 8,868,933 B2 | 10/2014 | Gardner | |
| 9,465,958 B2 | 10/2016 | Gardner | |
| 9,465,959 B2 | 10/2016 | Gardner | |
| 11,237,839 B2* | 2/2022 | Tillery, Jr. | G06F 9/4403 |
| 2001/0039612 A1 | 11/2001 | Lee | |
| 2009/0063810 A1 | 3/2009 | Garcia-Tobin | |
| 2014/0101535 A1 | 4/2014 | Kim et al. | |
| 2019/0339991 A1 | 11/2019 | Reddy et al. | |

OTHER PUBLICATIONS

Vincent Zimmer et al., "Beyond BIOS Developing with the Unified Extensible Firmware Interface, 2$^{nd}$ Edition", Intel Press 427 pages, Nov. 2010.
Sarathy Jayakumar's "ACPI Based "Platform Communication Channel" (PCC) Mechanism", Intel White Paper, 15 pages, Oct. 2015.
"Advanced Configuration and Power Interface Specification Version 6.0" Unified EFI, Inc., Apr. 2015, 1056 pages.
"Advanced Configuration and Power Interface Specification Version 6.2" Unified EFI, Inc., May 2017, 1192 pages.

* cited by examiner

SYSTEM AND METHOD OF UTILIZING PLATFORM APPLICATIONS WITH INFORMATION HANDLING SYSTEMS

BACKGROUND

Field of the Disclosure

This disclosure relates generally to information handling systems and more particularly to utilizing platform applications with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may execute, by at least one processor of an information handling system (IHS), at least a portion of IHS firmware (IHSFW) from a first non-volatile memory medium of the IHS; may retrieve, from a first non-volatile memory medium, a first IHS initialization executable of a first IHS initialization executable/operating system (OS) executable pair; may execute, by the at least one processor, the first IHS initialization executable via an environment associated with the IHSFW; may register, by the first IHS initialization executable, a subroutine configured to store multiple addresses of a volatile memory medium of the IHS; may copy, by the first IHS initialization executable, a first OS executable of the first IHS initialization executable/OS executable pair from the first non-volatile memory medium to the volatile memory medium; for each IHS initialization executable/OS executable pair of multiple IHS initialization executable/OS executable pairs: may retrieve, from the first non-volatile memory medium, an IHS initialization executable of the IHS initialization executable/OS executable pair; may execute, by the at least one processor, the IHS initialization executable via the environment associated with the IHSFW; may copy, by the IHS initialization executable, an OS executable of the IHS initialization executable/OS executable pair from the first non-volatile memory medium to the volatile memory medium; may call, by the IHS initialization executable, the subroutine; may store, by the subroutine, an address associated with the OS executable via a data structure stored by the volatile memory medium; may retrieve, by the first OS executable, the address of the volatile memory medium associated with the OS executable from the data structure; and may copy, by the first OS executable, the OS executable from the volatile memory medium to a second non-volatile memory medium based at least on the address of the volatile memory medium associated with the OS executable; and may execute, by the at least one processor, each OS executable of the multiple IHS initialization executable/OS executable pairs via an OS context of an operating system.

In one or more embodiments, each OS executable of the multiple IHS initialization executable/OS executable pairs may endure on the second non-volatile memory medium after another operating system, different from the operating system, has been installed on the second non-volatile memory medium. In one or more embodiments, the environment associated with the IHSFW environment may include a driver execution environment (DXE). In one example, a first DXE driver may include the first IHS initialization executable. In another example, each of multiple of DXE drivers may include a respective IHS initialization executable of the multiple IHS initialization executable/OS executable pairs. In one or more embodiments, the first non-volatile memory medium may store an IHSFW volume. For example, the IHSFW volume may store the first IHS initialization executable/OS executable pair and the multiple IHS initialization executable/OS executable pairs. In one or more embodiments, the first non-volatile memory medium may include a serial interface flash memory device. In one or more embodiments, the data structure may include a table that is compliant with an Advanced Configuration and Power Interface (ACPI) table. For example, the one or more systems, the one or more methods, and/or the one or more processes may further register the table with an ACPI service.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
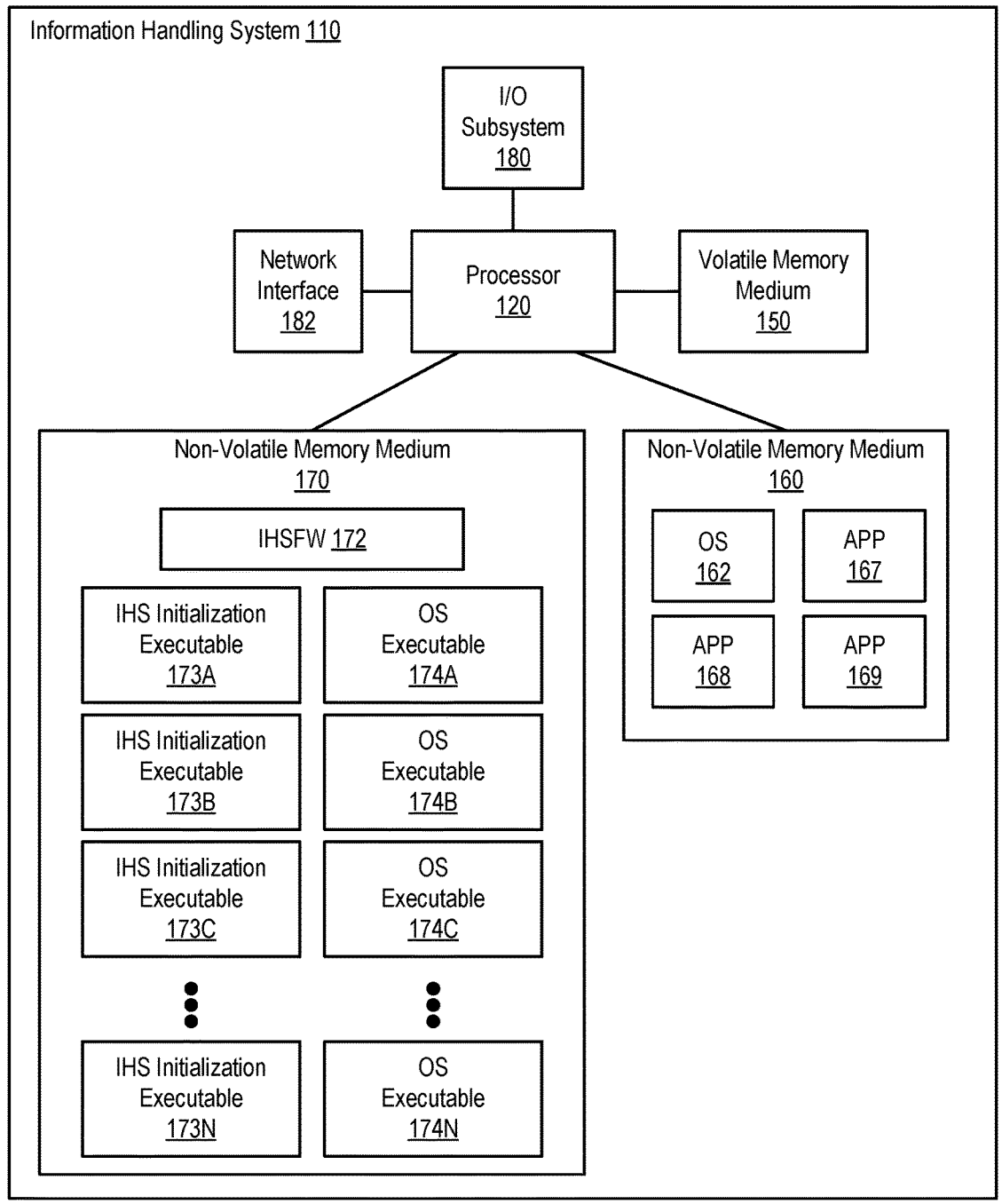
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an operating system (OS) may provide a capability, in a new installation or in a reinstallation, which works in conjunction with information handling system firmware (IHSFW) to execute an IHSFW-based platform application. For example, the platform application may enable an information handling system (IHS) manufacturer with an option to install an application on an IHS where existing applications of the OS may not be adequate. For instance, the platform application may be configured to accommodate specific characteristics of an IHS, such as specific characteristic of a hardware component of the IHS. In one or more embodiments, the platform application may be installed after the OS is installed or after the OS is reinstalled. In one example, in this fashion, the platform application may have continuity across multiple OS installations on same or different non-volatile memory media (e.g., solid state drive(s), hard drive(s), etc.). In a second example, in this fashion, the platform application may endure across multiple OS installations on same or different non-volatile memory media (e.g., solid state drive(s), hard drive(s), etc.). In another example, in this fashion, the platform application may be installed or reinstalled across multiple OS installations on same or different non-volatile memory media (e.g., solid state drive(s), hard drive(s), etc.).

In one or more embodiments, multiple platform applications may be installed via a platform application controller. For example, the OS may instruct a processor of the IHS to execute the platform application controller. For instance, the platform application controller may include one or more structures and/or one or more functionalities of a session manager. In one or more embodiments, the session manager may instruct the processor to execute multiple additional platform applications.

In one or more embodiments, a first data structure may be populated with information associated with a platform application. For example, the first data structure may include a first table. In one instance, the first table may be compliant with an Advanced Configuration and Power Interface (ACPI) table. In another instance, the first table may be or include an ACPI table. In one or more embodiments, the first data structure may be utilized to communicate information, associated with the platform application, between the IHSFW and the OS.

In one or more embodiments, a second data structure may be populated with information associated with one or more additional platform applications. For example, the second data structure may include a second table. In one instance, the second table may be compliant with an ACPI table. In another instance, the second table may be or include an ACPI table. In one or more embodiments, the second data structure may be utilized to communicate information, associated with the one or more additional platform applications, between the OS and the IHSFW.

In one or more embodiments, the one or more additional platform applications may enable one or more options to install the one or more additional applications on the IHS where existing applications of the OS may not be adequate. For example, the one or more additional platform applications may provide one or more advantages over a single platform application. In one instance, utilizing the one or more additional platform applications may provide a granular control over enabling and/or disabling the one or more additional applications. In another instance, utilizing the one or more additional platform applications may provide one or more options for one or more third-party vendors to provide their respective one or more platform applications without having to incorporate such functionalities into a single platform application.

In one or more embodiments, during a launch of the OS, a session manager may load the platform controller and instruct the processor to execute the platform controller. In one or more embodiments, the platform controller may perform a process that loaded and executed the platform controller to load and instruct the processor to execute the one or more additional platform applications. For example, the platform controller may access the second data structure and retrieve information associated with the one or more additional platform applications. In one or more embodiments, the one or more additional platform applications may be stored via a non-volatile memory medium of the IHS. For example, the non-volatile memory medium of the IHS may include a hard disk drive, a solid state drive, etc. For instance, the one or more additional platform applications may be stored via a non-volatile memory medium of the IHS where the OS is stored.

Turning now to FIG. 1A, an example of an information handling system is illustrated, according to one or more embodiments. An IHS 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, Hyper-Transport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 180, and a network interface 182. As illustrated, volatile memory medium 150, non-volatile memory media 160 and 170, I/O subsystem 180, and network interface 182 may be communicatively coupled to processor 120.

In one or more embodiments, one or more of volatile memory medium 150, non-volatile memory media 160 and 170, I/O subsystem 180, and network interface 182 may be communicatively coupled to processor 120 via one or more buses, one or more switches, and/or one or more root complexes, among others. In one example, one or more of volatile memory medium 150, non-volatile memory media 160 and 170, I/O subsystem 180, and network interface 182 may be communicatively coupled to processor 120 via one or more PCI-Express (PCIe) root complexes. In another example, one or more of an I/O subsystem 180 and a network interface 182 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 182 may be utilized in communicating with one or more networks and/or one or more other information handling systems. In one example, network interface 182 may enable IHS 110 to communicate via a network utilizing a suitable transmission protocol and/or standard. In a second example, network interface 182 may be coupled to a wired network. In a third example, network interface 182 may be coupled to an optical network. In another example, network interface 182 may be coupled to a wireless network.

In one or more embodiments, network interface 182 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 182 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 180 may represent a variety of communication interfaces, graphics interfaces, video interfaces, user input interfaces, and/or peripheral interfaces, among others. For example, I/O subsystem 180 may include one or more of a touch panel and a display adapter, among others. For instance, a touch panel may include circuitry that enables touch functionality in conjunction with a display that is driven by a display adapter.

As shown, non-volatile memory medium 160 may include an OS 162, and applications (APPs) 167-169. In one or more embodiments, one or more of OS 162 and APPs 167-169 may include processor instructions executable by processor 120. In one example, processor 120 may execute processor instructions of one or more of OS 162 and APPs 167-169 via non-volatile memory medium 160. In another example, one or more portions of the processor instructions of the one or more of OS 162 and APPs 167-169 may be transferred to volatile memory medium 150, and processor 120 may execute the one or more portions of the processor instructions of the one or more of OS 162 and APPs 167-169 via volatile memory medium 150.

In one or more embodiments, OS 162 may be or include an UNIX® operating system. In one or more embodiments, OS 162 may be or include an Unix-like operating system. For instance, the Unix-like operating system may be or include LINUX®, FREEBSD®, NETBSD®, MACOS®, OpenBSD, Minix, Xinu, or Darwin, among others. In another example, OS 162 may be or include a portable operating system interface (POSIX) compliant operating system. In one or more embodiments, OS 162 may be or include a MICROSOFT® WINDOWS® operating system.

As illustrated, non-volatile memory medium 170 may include IHSFW 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an ACPI, among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150. As shown, non-volatile memory medium 170 may include IHS initialization executables 173A-173N. In one or more embodiments, IHS initialization executables 173A-173N may be executable in an environment of IHSFW 172. For example, IHS initialization executables 173A-173N may be executable in a Driver Execution Environment (DXE) of IHSFW 172.

In one or more embodiments, an IHS initialization executable 173 may be an initializing executable. For example, an IHS initialization executable 173 may at least a portion of IHS 110. For instance, IHSFW 172 may discover and execute an IHS initialization executable 173 to initialize at least a portion of IHS 110. In one or more embodiments, an IHS initialization executable 173 may be associated with a portable execution/common object file format (PE/COFF). For example, IHSFW 172 may include a PE/COFF loader to load and execute an IHS initialization executable 173. In one or more embodiments, an IHS initialization executable 173 may be a DXE driver. For example, IHSFW 172 may include a DXE dispatcher that may discover and execute an IHS initialization executable 173 to initialize at least a portion of IHS 110.

As illustrated, non-volatile memory medium 170 may include OS executables 174A-174N. In one or more embodiments, OS executables 174A-174N may be executable in an environment of OS 162. For example, one or more of OS executables 174A-174N may be platform applications.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

Figure 1B:
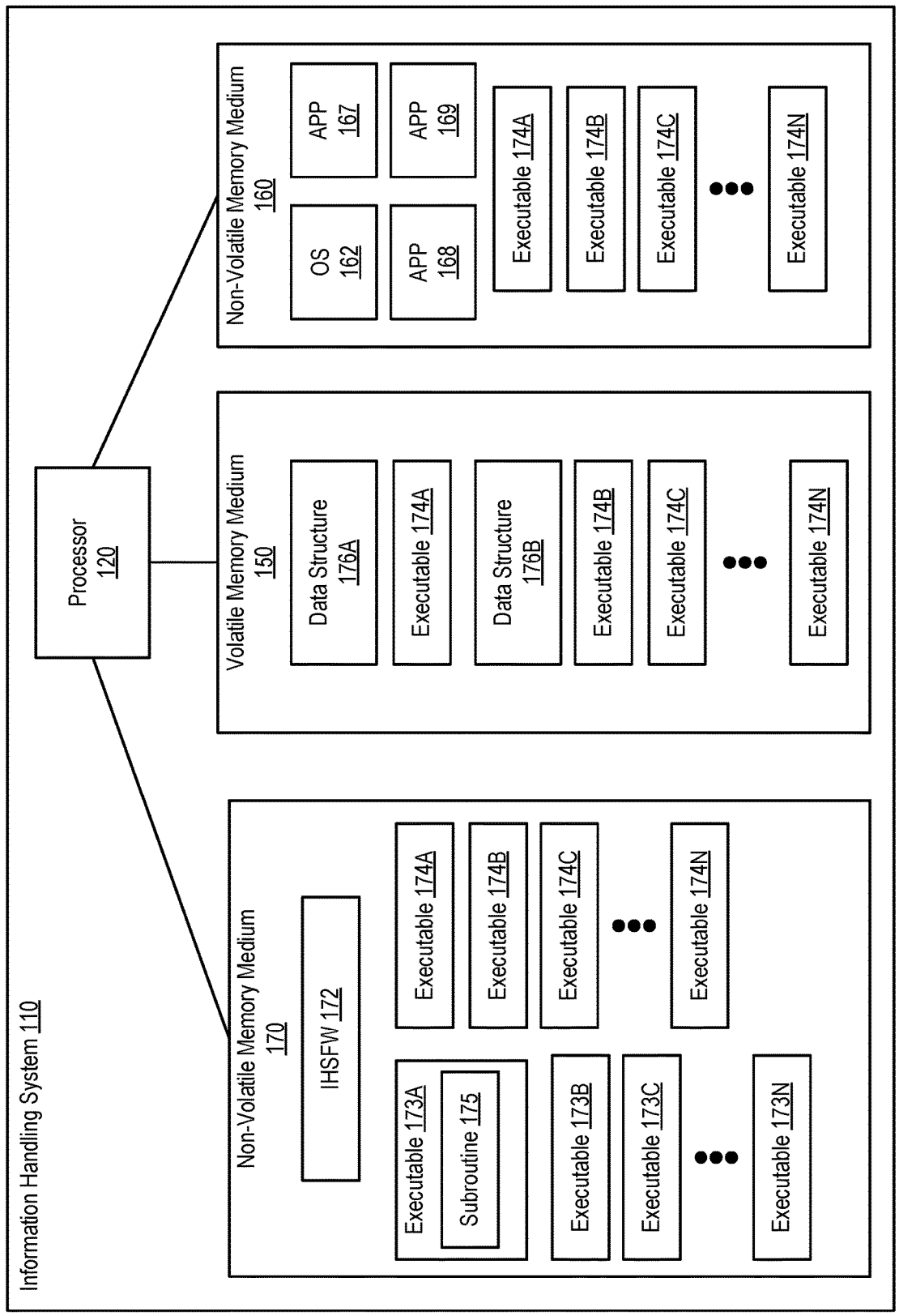
FIG. 1B illustrates another example of an information handling system, according to one or more embodiments.

Turning now to FIG. 1B, another example of an information handling system is illustrated, according to one or more embodiments. In one or more embodiments, IHS initialization executable 173A may be executed. For example, IHS initialization executable 173A may be executed via at least a portion of IHSFW 172. For instance, the at least the portion of IHSFW 172 may determine that non-volatile memory medium 170 includes IHS initialization executable 173A and may instruct processor 120 to execute IHS initialization executable 173A. In one or more embodiments, IHSFW 172 may include and/or may provide an environment. For example, IHSFW 172 may include and/or may provide a DXE. In one or more embodiments, an executable 173 may be a DXE driver. For example, the DXE driver may be executed in a DXE. For instance, processor 120 may execute the DXE driver via the DXE and/or may execute the DXE driver within the DXE. In one or more embodiments, a DXE driver may typically be associated with a hardware component of IHS 110. For example, the DXE driver may enable IHSFW 172 to communicate with the hardware component. In one or more embodiments, a DXE driver may not be associated with a hardware component of IHS 110. For example, an IHS initialization executable 173 may be a DXE driver but may not be associated with a hardware component of IHS 110. For instance, an executable 173 may permit instructions of processor 120 to execute via the DXE.

As shown, IHS initialization executable 173A may include a subroutine 175. In one or more embodiments, subroutine 175 may include instructions, executable by processor 120, to implement at least a portion of one or more systems, at least a portion of one or more flowcharts, at least a portion of one or more methods, and/or at least a portion of one or more processes described herein. For example, processor 120 may execute processor instructions of subroutine 175 in implementing at least a portion of one or more systems, at least a portion of one or more flowcharts, at least a portion of one or more methods, and/or at least a portion of one or more processes described herein.

In one or more embodiments, subroutine 175 may be registered with at least a portion of IHSFW 172. For example, executing IHS initialization executable 173A may register subroutine 175 with at least a portion of IHSFW 172. In one or more embodiments, one or more of IHS initialization 173B-173N may call subroutine 175. For example, the one or more of IHS initialization executables 173B-173N may call subroutine 175 after subroutine 175 is registered. For instance, the one or more of executables 173B-173N may instruct processor 120 to execute subroutine 175.

In one or more embodiments, a data structure 176A may be created in volatile memory medium 150. For example, executing IHS initialization executable 173A may create data structure 176A in volatile memory medium 150. In one or more embodiments, data structure 176A may be compliant with an ACPI table. In one or more embodiments, data structure 176A may include an ACPI table.

In one or more embodiments, OS executable 174A may be copied from non-volatile memory medium 170 to volatile memory medium 150. For example, IHS initialization executable 173A may copy OS executable 174A from non-volatile memory medium 170 to volatile memory medium 150. In one instance, copying OS executable 174A from non-volatile memory medium 170 to volatile memory medium 150 may include retrieving OS executable 174A from non-volatile memory medium 170. In another instance, copying OS executable 174A from non-volatile memory medium 170 to volatile memory medium 150 may include writing executable 174A to volatile memory medium 150.

In one or more embodiments, an identifier may be associated with OS executable 174A. For example, the identifier associated with OS executable 174A may include a globally unique identifier (GUID). In one or more embodiments, the GUID may include a number. For example, the GUID may include a 128-bit number. In one or more embodiments, when generated via one or more methods, globally unique identifiers (GUIDs) may be unique for practical purposes. For example, the uniqueness of GUIDs may not depend on a central registration authority or coordination between parties generating the GUIDs. Although a probability that a GUID will be duplicated may not be zero, the probability that a GUID will be duplicated is close enough to zero to be negligible, according to one or more embodiments. In one or more embodiments, a GUID may be or include a universally unique identifier (UUID).

Figure 1D:
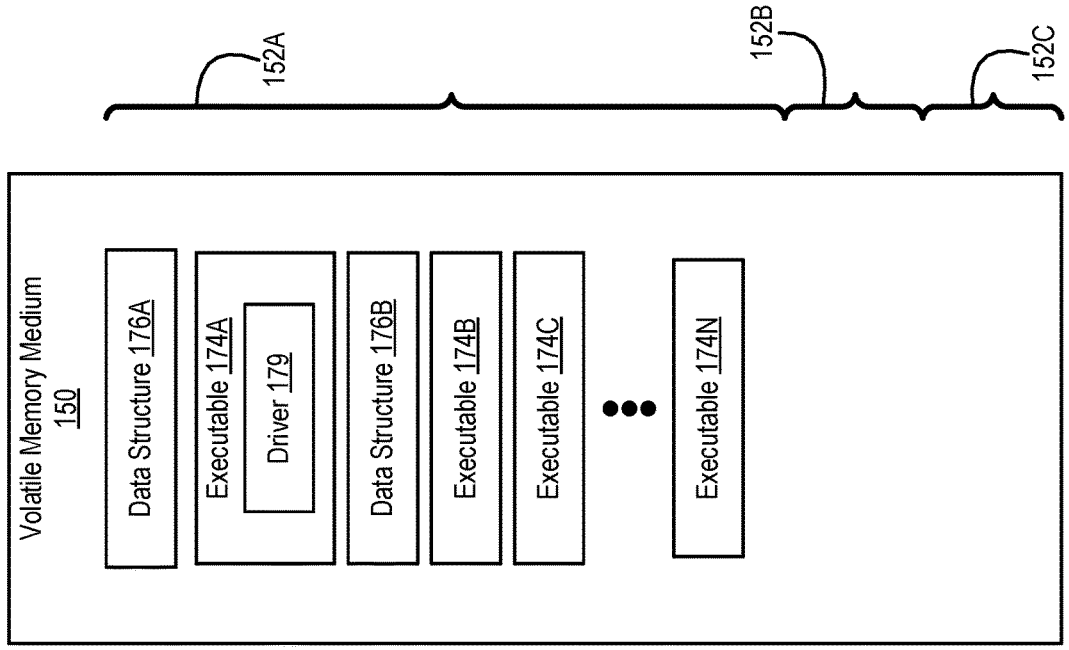
FIG. 1D illustrates examples of portions of a memory medium, according to one or more embodiments.
Figure 1C:
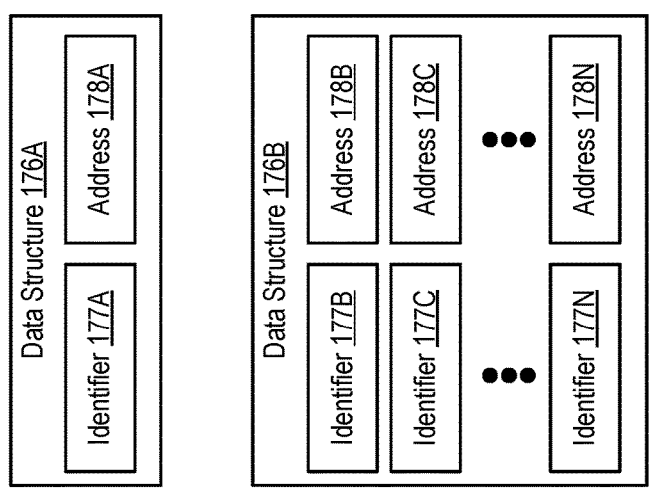
FIG. 1C illustrates examples of data structures that stores identifiers respectively associated with executables, according to one or more embodiments.

In one or more embodiments, data structure 176A may store the identifier associated with OS executable 174A. For example, as illustrated in FIG. 1C, data structure 176A may store an identifier 177A associated with OS executable 174A. In one or more embodiments, data structure 176A may store an address of volatile memory medium 150 associated with OS executable 174A. For example, as illustrated in FIG. 1C, data structure 176A may store an address 178A associated with OS executable 174A. In one instance, address 178A of volatile memory medium 150 associated with executable 174A may be a real address of volatile memory medium 150. In another instance, address 178A of volatile memory medium 150 associated with OS executable 174A may be a virtual address associated with a real address of volatile memory medium 150. In one or more embodiments, the identifier associated with OS executable 174A may be utilized to access address 178A of volatile memory medium 150 associated with OS executable 174A. For example, data structure 176A may match identifier 177A associated with OS executable 174A with address 178A of volatile memory medium 150 associated with OS executable 174A.

Referring back to FIG. 1B, in one or more embodiments, IHS initialization executable 173B may be executed. For example, IHS initialization executable 173B may be executed via at least a portion of IHSFW 172. For instance, the at least the portion of IHSFW 172 may determine that non-volatile memory medium 170 includes IHS initialization executable 173B and may instruct processor 120 to execute IHS initialization executable 173B.

In one or more embodiments, IHS initialization executable 173B may call subroutine 175. For example, IHS initialization executable 173B may instruct processor 120 to execute subroutine 175. In one or more embodiments, a data structure 176B may be created in volatile memory medium 150. For example, subroutine 175 may create data structure 176B in volatile memory medium 150. In one instance, subroutine 175 may create data structure 176B in volatile memory medium 150 in response to being called by IHS initialization executable 173B. In another instance, subroutine 175 may create data structure 176B in volatile memory medium 150 in response to determining that data structure 176B does not exist in volatile memory medium 150. In one or more embodiments, data structure 176B may be compliant with an ACPI table. In one or more embodiments, data structure 176B may include an ACPI table.

In one or more embodiments, OS executable 174B may be copied from non-volatile memory medium 170 to volatile memory medium 150. For example, IHS initialization executable 173B may copy OS executable 174A from non-volatile memory medium 170 to volatile memory medium 150. In one instance, copying OS executable 174B from non-volatile memory medium 170 to volatile memory medium 150 may include retrieving OS executable 174B from non-volatile memory medium 170. In another instance, copying OS executable 174B from non-volatile memory medium 170 to volatile memory medium 150 may include writing OS executable 174B to volatile memory medium 150. In one or more embodiments, an identifier may be associated with OS executable 174B. For example, the identifier associated with executable 174B may include a GUID.

In one or more embodiments, data structure 176B may store the identifier associated with OS executable 174B. For example, as illustrated in FIG. 1C, data structure 176B may store an identifier 177B associated with OS executable 174B. In one or more embodiments, data structure 176B may store an address of volatile memory medium 150 associated with OS executable 174B. For example, as illustrated in FIG. 1C, data structure 176B may store an address 178B of volatile memory medium 150 associated with OS executable 174B. In one instance, address 178B of volatile memory medium 150 associated with OS executable 174B may be a real address of volatile memory medium 150. In another instance, address 178B of volatile memory medium 150 associated with OS executable 174B may be a virtual address associated with a real address of volatile memory medium 150. In one or more embodiments, an address 178 may indicate to processor 120 where to start executing an OS executable 174. In one or more embodiments, identifier 177B associated with OS executable 174B may be utilized to access the address of volatile memory medium 150 associated with OS executable 174B. For example, data structure 176B may match identifier 177B associated with OS executable 174B with address 178B of volatile memory medium 150 associated with OS executable 174B.

In one or more embodiments, one or more methods and/or one or more processes described above with reference to executable 174B may be utilized with OS executables 174C-174N. For example, OS executables 174C-174N may be copied from non-volatile memory medium 170 to volatile memory medium 150. For instance, one or more of IHS initialization executables 173C-173N may be executed and may respectively copy one or more of OS executables 174C-174N from non-volatile memory medium 170 to volatile memory medium 150. In one or more embodiments, data structure 176B may store identifiers 177C-177N respectively associated with executables 174C-174N. In one or more embodiments, data structure 176B may store addresses 178C-178N of volatile memory medium 150 respectively associated with OS executables 174C-174N. For example, data structure 176B may match identifiers 177C-177N respectively associated with OS executables 174C-174N with respective addresses 178C-178N of volatile memory medium 150 associated with OS executables 174C-174N. For instance, a data structure 176 may include a table. In one or more embodiments, a table entry of a data structure 176 may store an identifier 177 and an address 178.

Referring back to FIG. 1B, in one or more embodiments, OS executable 174A may be copied from volatile memory medium 150 to non-volatile memory medium 160. For example, OS 162 may copy OS executable 174A from volatile memory medium 150 to non-volatile memory medium 160. In one instance, copying OS executable 174A from volatile memory medium 150 to non-volatile memory medium 160 may include retrieving executable 174A from volatile memory medium 150. In another instance, copying OS executable 174A from volatile memory medium 150 to non-volatile memory medium 160 may include writing executable 174A to non-volatile memory medium 160. In one or more embodiments, OS 162 may include a MICROSOFT® WINDOWS® operating system. For example, a MICROSOFT® WINDOWS® operating system session manager may copy OS executable 174A from volatile memory medium 150 to non-volatile memory medium 160. For instance, the MICROSOFT® WINDOWS® operating system session manager may be executed via a startup process of the MICROSOFT® WINDOWS® operating system. In one or more embodiments, OS 162 may launch executable 174A. For example, launching OS executable 174A may include instructing processor 120 to execute executable 174A. For instance, the MICROSOFT® WINDOWS® operating system session manager may instruct processor 120 to execute OS executable 174A. In one or more embodiments, executable 174A may be a platform controller.

In one or more embodiments, OS executable 174A may determine that data structure 176B exists in volatile memory medium 150. For example, OS executable 174A may access data structure 176B. For instance, OS executable 174A may access identifiers stored via data structure 176B. In one or more embodiments, OS executable 174A may utilize an identifier associated with executable 174B. For example, OS executable 174A may determine an address of volatile memory medium associated with OS executable 174B based at least on the identifier associated with OS executable 174B.

In one or more embodiments, OS executable 174A may copy OS executable 174B from volatile memory medium 150 to non-volatile memory medium 160. In one example, copying OS executable 174B from volatile memory medium 150 to non-volatile memory medium 160 may include retrieving OS executable 174B from volatile memory medium 150. In another example, copying OS executable 174B from volatile memory medium 150 to non-volatile memory medium 160 may include writing OS executable 174B to non-volatile memory medium 160.

In one or more embodiments, one or more methods and/or one or more processes described above with reference to executable 174B may be utilized with executables 174C-174N. For example, OS executables 174C-174N may be copied from volatile memory medium 150 to volatile non-memory medium 160. For instance, OS executable 174A may copy one or more of OS executables 174C-174N from volatile memory medium 150 to volatile non-memory medium 160. In one or more embodiments, data structure 176B may store identifiers respectively associated with OS executables 174C-174N. In one or more embodiments, data structure 176B may store addresses of volatile memory medium 150 respectively associated with OS executables 174C-174N. For example, data structure 176B may match the identifiers respectively associated with OS executables 174C-174N with respective addresses of volatile memory medium 150 associated with OS executables 174C-174N. In one or more embodiments, OS executable 174A may determine an address of addresses 178B-178N via a respective identifier of identifiers 177B-177N. For example, OS executable 174A may copy an executable of OS executables 174B-174N from volatile memory medium 150 to volatile non-memory medium 160 based at least on the determined address.

In one or more embodiments, information of data structure 176B may be provided to OS executable 174A via a command line. For example, identifiers 177B-177N and respectively associated addresses 178B-178N may be passed on the command line to OS executable 174A. In one instance, a script may pass identifiers 177B-177N and respectively associated addresses 178B-178N on the command line to OS executable 174A. In another instance, an executable may pass identifiers 177B-177N and respectively associated addresses 178B-178N on the command line to OS executable 174A. In one or more embodiments, data structure 176B may not be created or may not be utilized. For example, identifiers 177B-177N and respectively associated addresses 178B-178N may be passed via an instruction to run OS executable 174A without creating data structure 176B. For instance, identifiers 177B-177N and respectively associated addresses 178B-178N may be passed on a command line to OS executable 174A without creating data structure 176B.

In one or more embodiments, volatile memory medium 150 may be associated with multiple portions. Referring to FIG. 1D, for example, volatile memory medium 150 may be associated with multiple memory portions 152A-152C. For instance, a memory portion 152 may be associated with an address range. As an example, memory portions 152A-152C may be respectively associated with different address ranges. Although three memory portions are illustrated in FIG. 1D, any number of memory portions may be utilized, according to one or more embodiments. In one or more embodiments, memory portion 152A may be associated with an address range that is accessible by IHSFW 172 and/or OS 162. For example, memory portion 152A may be associated with an address range that is accessible by a kernel of OS 162. In one instance, the address range associated with memory portion 152A may be accessed in a privileged mode. In another instance, the address range associated with memory portion 152A may not be accessible by a user space application and/or may not be accessible by instructions that are executed via user space.

In one or more embodiments, OS executable 174A may include a driver 179. For example, driver 179 may access memory portion 152A. In one instance, driver 179 may access a kernel of OS 162, which may access memory portion 152A. In another instance, driver 179 may include a loadable kernel module for a kernel of OS 162, which may access memory portion 152A. As an example, memory portion 152A may be accessible by a kernel of OS 162 or a loadable kernel module for the kernel of OS 162. For instance, memory portion 152A may be associated with kernel space, and memory portion 152B may be associated with user space. Driver 179 may enable OS executable 174A to access memory portion 152A (e.g., kernel space). For example, driver 179 may be executed in a privileged mode, which may access memory portion 152A.

In one or more embodiments, OS 162 may instruct processor 120 to execute one or more of executables 174B-174N. In one example, after OS 162 finishes a startup portion of OS 162, OS 162 may instruct processor 120 to execute one or more of OS executables 174B-174N. In another example, after OS 162 finishes the startup portion of OS 162, OS 162 may not instruct processor 120 to execute other one or more of OS executables 174B-174N. For instance, a user, a service, or an application (e.g., an application of APPs 167-169) may launch (e.g., start) the other one or more of OS executables 174B-174N. As an example, the other one or more of OS executables 174B-174N may include one or more applications. For instance, an executable of the other one or more of OS executables 174B-174N may include an application that includes one or more structures and/or one or more functionalities of an application of APPs 167-169.

In one or more embodiments, utilizing one or more systems, one or more methods, and/or one or more processes described herein, one or more of OS executables 174B-174N may have continuity across formatting non-volatile memory medium 160 and/or across installations of one or more operating systems on non-volatile memory medium 160. For example, one or more of OS executables 174B-174N may endure across formatting non-volatile memory medium 160. For instance, one or more of OS executables 174B-174N may be reinstalled after formatting non-volatile memory medium 160. In one or more embodiments, utilizing one or more systems, one or more methods, and/or one or more processes described herein, one or more of OS executables 174B-174N may have continuity across another installation of an operating system. For example, one or more of OS executables 174B-174N may endure across another installation of an operating system. For instance, one or more of executables 174B-174N may be reinstalled after another installation of an operating system.

Figure 2A:
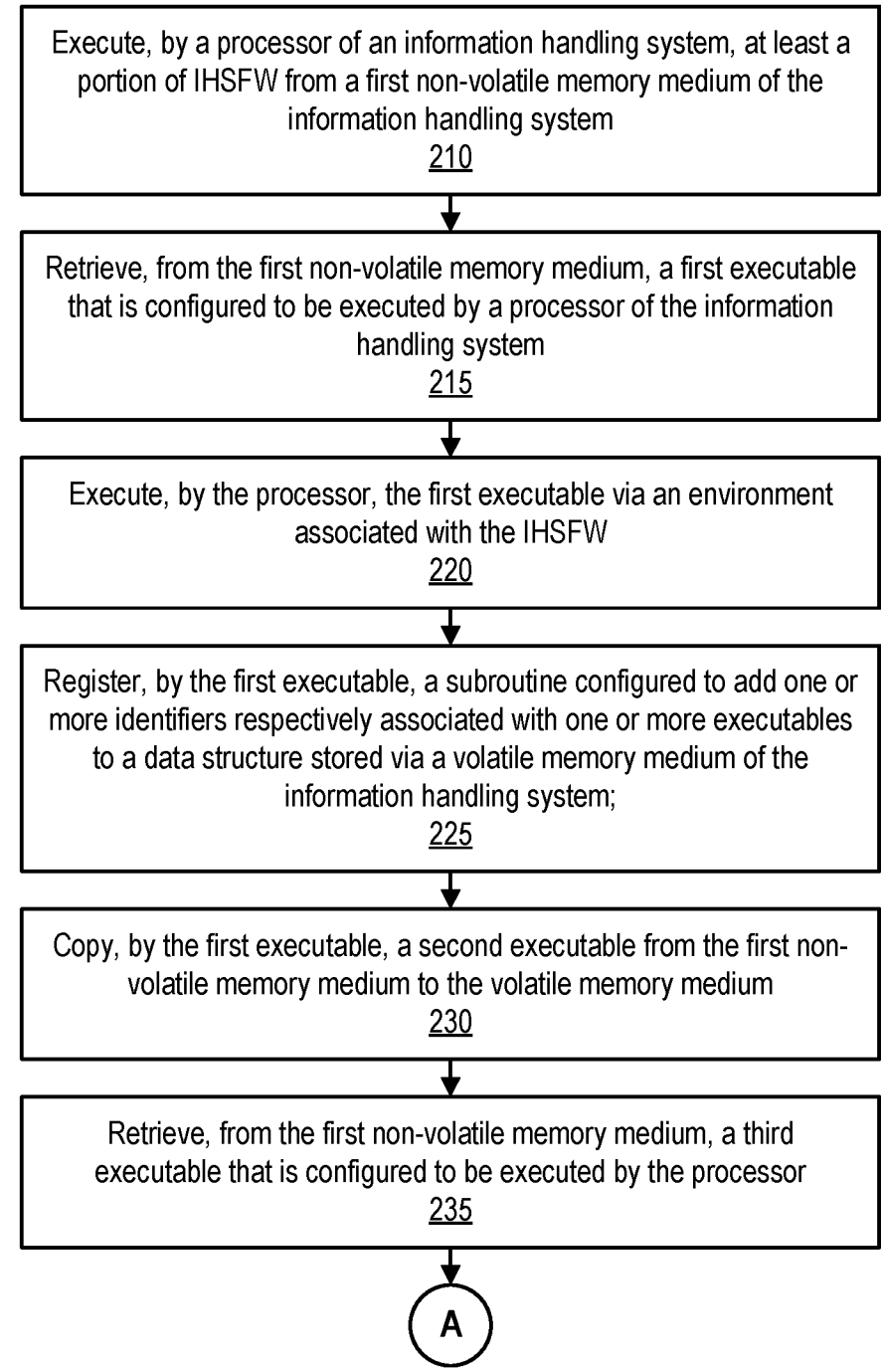
FIGS. 2A and 2B illustrate an example of a method of operating an information handling system, according to one or more embodiments.
Figure 2B:
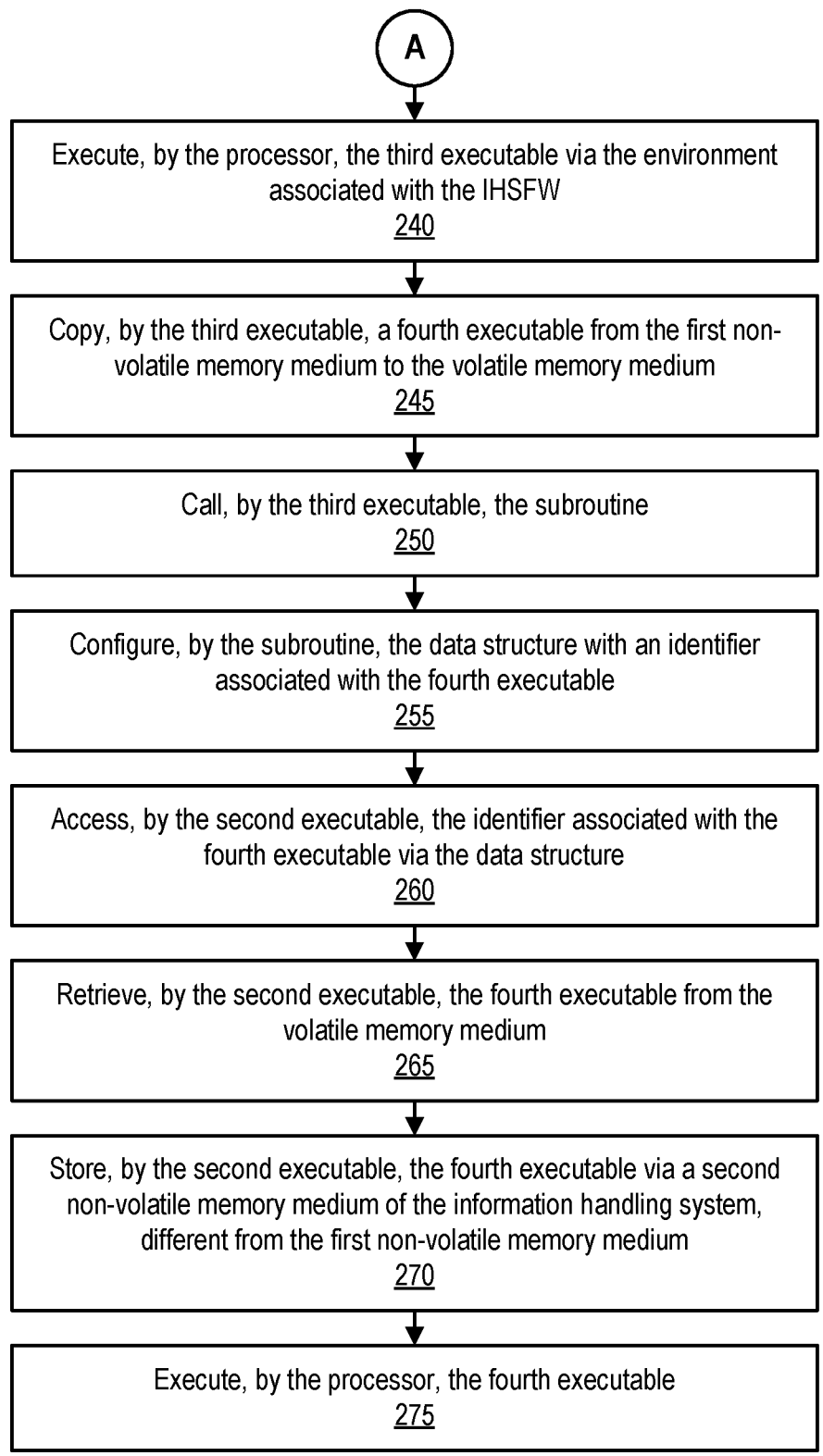

Turning now to FIGS. 2A and 2B, an example of a method of operating an information handling system is illustrated, according to one or more embodiments. At 210, at least a portion of IHSFW from a first non-volatile memory medium of the information handling system may be executed by a processor of the information handling system. For example, at least a portion of IHSFW 172, from non-volatile memory medium 170 of IHS 110, may be executed by processor 120 of IHS 110. In one or more embodiments, before executing, by the processor, the at least the portion of IHSFW, an operating system may be installed on a second non-volatile memory medium of the information handling system, different from the first non-volatile memory medium. For example, before executing, by processor 120, the at least the portion of IHSFW 172, OS 162 may be installed on non-volatile memory medium 160. In one or more embodiments, the first non-volatile memory medium may include a serial interface flash memory device. For instance, the serial interface flash memory device may be compliant with a serial bus and/or a serial protocol of a serial interface described herein.

At 215, a first executable that is configured to be executed by the processor may be retrieved from the first non-volatile memory medium. For example, IHS initialization executable 173A may be retrieved from non-volatile memory medium 170. At 220, the first executable may be executed by the processor via an environment associated with the IHSFW. For example, IHS initialization executable 173A may be executed by processor 120 via an environment associated with the IHSFW 172. In one or more embodiments, the environment associated with the IHSFW 172 may include a DXE. For example, a first DXE driver may include the first executable. For instance, a first DXE driver may include IHS initialization executable 173A.

At 225, a subroutine, configured to add one or more identifiers respectively associated with one or more executables to a data structure stored via a volatile memory medium of the information handling system, may be registered. For example, subroutine 175, configured to add one or more identifiers 177B-177N respectively associated with one or more of OS executables 174B-174N to data structure 176B stored via volatile memory medium 150. In one or more embodiments, the subroutine may be registered with the at least the portion of the IHSFW. In one or more embodiments, the data structure stored via the volatile memory medium may include a table that is compliant with an ACPI table. For example, the table may be registered with an ACPI service. In one or more embodiments, the operating system may access the table via the ACPI service. For example, OS 162 may access the table via the ACPI service. In one or more embodiments, OS 162 may access the ACPI service via a management information exchange. For example, OS 162 may access the ACPI service via one or more of a WMI and a CIM, among others.

At 230, a second executable may be copied, by the first executable, from the first non-volatile memory medium to the volatile memory medium. For example, OS executable 174A may be copied, by executable 173A, from non-volatile memory medium 170 to volatile memory medium 150. At 235, a third executable that is configured to be executed by the processor may be retrieved from the first non-volatile memory medium. For example, IHS initialization executable 173B may be retrieved from non-volatile memory medium 170.

At 240, the third executable may be executed by the processor via the environment associated with the IHSFW. For example, IHS initialization executable 173B may be executed by processor 120 via the environment associated with the IHSFW 172. In one or more embodiments, the environment associated with the IHSFW 172 may be a DXE. For example, a second DXE driver may include the third executable. For instance, a second DXE driver may include IHS initialization executable 173B. At 245, a fourth executable may be copied from the first non-volatile memory medium to the volatile memory medium. For example, executable 174B may be copied from non-volatile memory medium 170 to volatile memory medium 150.

At 250, the subroutine may be called by the third executable. For example, IHS initialization executable 173B may call subroutine 175. In one or more embodiments, calling the subroutine may include instructing the processor to execute the subroutine. For example, IHS initialization executable 173B may instruct processor 120 to execute subroutine 175. At 255, the data structure may be configured, by the subroutine, with an identifier associated with the fourth executable. For example, data structure 176B may be configured, by subroutine 175, with an identifier associated with OS executable 174B. For instance, data structure 176B may be configured, by subroutine 175, with identifier 177B associated with executable 174B. In one or more embodiments, the identifier associated with the fourth executable may include a GUID. For example, identifier 177B may include a GUID.

At 260, the identifier associated with the fourth executable may be accessed by the second executable via the data structure. For example, the identifier associated with fourth executable may be access by the second executable via the data structure. At 265, the fourth executable may be retrieved, by the second executable, from the volatile memory medium. For example, OS executable 174B may be retrieved, by OS executable 174A, from volatile memory medium 150.

At 270, the fourth executable may be stored via the second non-volatile memory medium of the information handling system, different from the first non-volatile memory medium. For example, OS executable 174B may be stored via non-volatile memory medium 160. At 275, the fourth executable may be executed by the processor. For example, executable 174B may be executed by processor 120. For instance, OS 162 may instruct processor 120 to execute OS executable 174B.

Figure 3A:
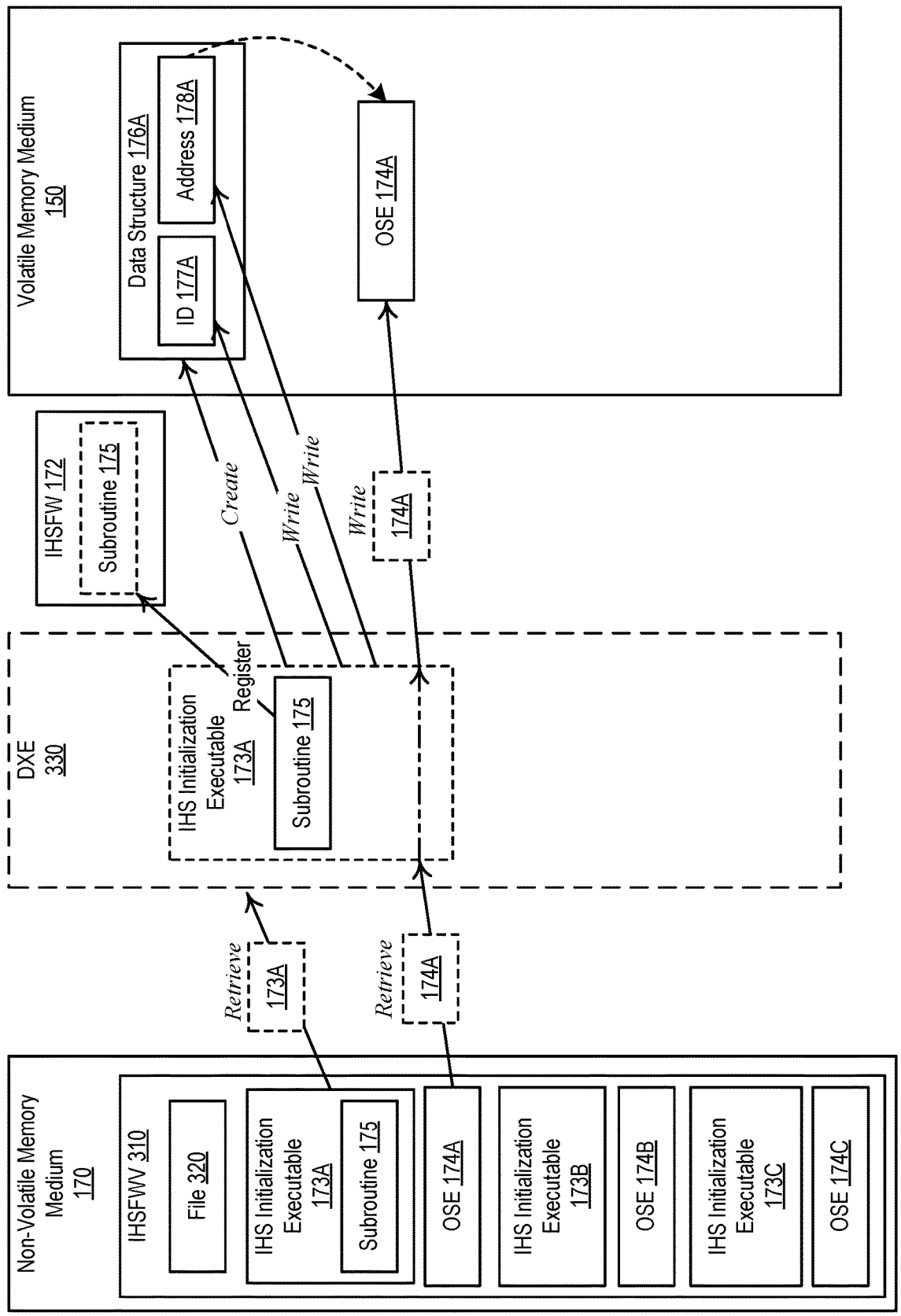
FIG. 3A illustrates an example of providing a first operating system executable to a volatile memory medium, according to one or more embodiments.

Turning now to FIG. 3A, an example of providing a first operating system executable to a volatile memory medium is illustrated, according to one or more embodiments. As shown, non-volatile memory medium 170 may store an IHSFW volume (IHSFWV) 310. As illustrated, IHSFWV 310 may include a file 320. In one or more embodiments, at least a portion of IHSFW 172 may determine an ordering of IHS initialization executables 173A-173C based at least on an ordering indicated by file 320. For example, the at least the portion of IHSFW 172 may includes a DXE 330. For instance, file 320 may include an a priori file. In one or more embodiments, a name of file 320 may include a GUID. For example, DXE 330 may store the name of file 320. For instance, DXE 330 may retrieve file 320 from IHSFWV 310 based at least on the name of file 320. In one or more embodiments, DXE 330 may include a DXE dispatcher. For example, the DXE dispatcher may store the name of file 320. For instance, the DXE dispatcher may retrieve file 320 from IHSFWV 310 based at least on the name of file 320.

As shown, DXE 330 may retrieve IHS initialization executable 173A from non-volatile memory medium 170. For example, DXE 330 may retrieve IHS initialization executable 173A from IHSFWV 310. In one or more embodiments, a first IHS initialization executable/OS executable pair may include IHS initialization executable 173A and OS executable (OSE) 174A. In one or more embodiments, processor 120 may execute IHS initialization executable 173A via DXE 330. For example, IHS initialization executable 173A may include a DXE driver. As illustrated, IHS initialization executable 173A may register a subroutine 175 with IHSFW 172. In one or more embodiments, one or more of IHS initialization executables 173B-173N may call subroutine 175.

As shown, OS executable 174A may be retrieved from non-volatile memory medium 170. For example, IHS initialization executable 173A may retrieve OS executable 174A from non-volatile memory medium 170. For instance, OS executable 174A may be retrieved from IHSFWV 310. As illustrated, IHS initialization executable 173A may write OS executable 174A to volatile memory medium 150. For example, IHS initialization executable 173A may write OS executable 174A to volatile memory medium 150 at an address 178A associated with volatile memory medium 150. As shown, IHS initialization executable 173A may create data structure 176A in volatile memory medium 150. In one or more embodiments, data structure 176A may be compliant with an ACPI table. As an example, data structure 176A may include an ACPI table.

As illustrated, IHS initialization executable 173A may write identification (ID) 177A associated with OS executable 174A to data structure 176A. For example, IHS initialization executable 173A may store, via data structure 176A, ID 177A associated with OS executable 174A. As shown, IHS initialization executable 173A may write address 178A associated with OS executable 174A to data structure 176A. For example, IHS initialization executable 173A may store, via data structure 176A, address 178A associated with OS executable 174A. In one or more embodiments, address 178A may be an address of memory portion 152A (of FIG. 1D).

Figure 3B:
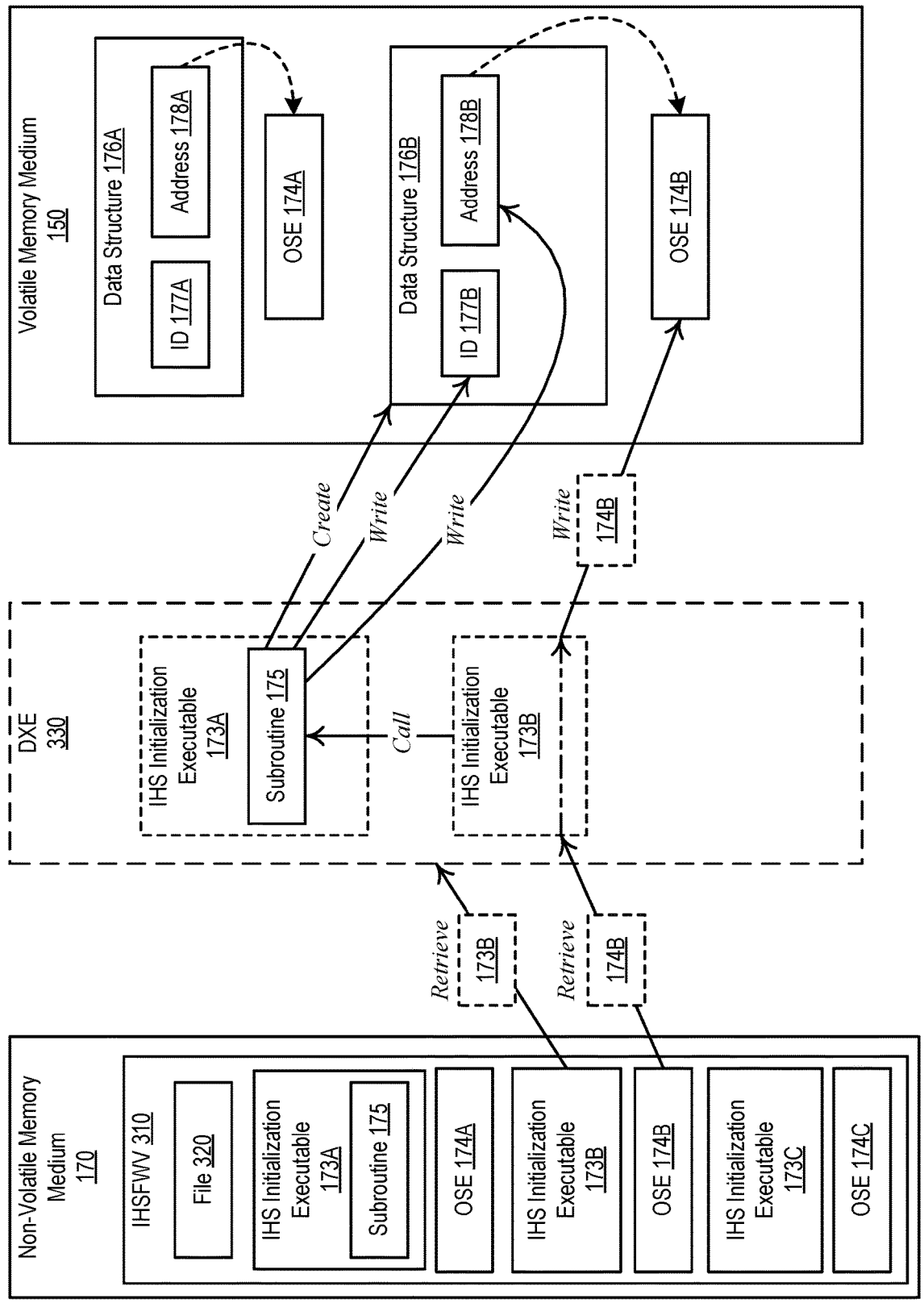
FIG. 3B illustrates an example of providing a second operating system executable to a volatile memory medium, according to one or more embodiments.

Turning now to FIG. 3B, an example of providing a second operating system executable to a volatile memory medium is illustrated, according to one or more embodiments. As shown, DXE 330 may retrieve IHS initialization executable 173B from non-volatile memory medium 170. For example, DXE 330 may retrieve IHS initialization executable 173B from IHSFWV 310. In one or more embodiments, a second IHS initialization executable/OS executable pair may include IHS initialization executable 173B and OS executable 174B. In one or more embodiments, processor 120 may execute IHS initialization executable 173B via DXE 330. For example, IHS initialization executable 173B may include a DXE driver.

As shown, OS executable 174B may be retrieved from non-volatile memory medium 170. For example, IHS initialization executable 173B may retrieve OS executable 174B from non-volatile memory medium 170. For instance, OS executable 174B may be retrieved from IHSFWV 310. As illustrated, IHS initialization executable 173B may write OS executable 174B to volatile memory medium 150. For example, IHS initialization executable 173B may write OS executable 174B to volatile memory medium 150 at an address 178B associated with volatile memory medium 150. For instance, address 178B may be an address of memory portion 152A.

As shown, IHS initialization executable 173B may call subroutine 175. In one or more embodiments, IHS initialization executable 173B may provide address 178B to subroutine 175. As illustrated, subroutine 175 may create data structure 176B in volatile memory medium 150. In one or more embodiments, data structure 176B may be compliant with an ACPI table. As an example, data structure 176B may include an ACPI table. As illustrated, subroutine 175 may write ID 177B associated with OS executable 174B to data structure 176B. For example, subroutine 175 may store, via data structure 176B, ID 177B associated with OS executable 174B. As shown, subroutine 175 may write address 178B associated with OS executable 174B to data structure 176B. For example, subroutine 175 may store, via data structure 176B, address 178B associated with OS executable 174B.

Figure 3C:
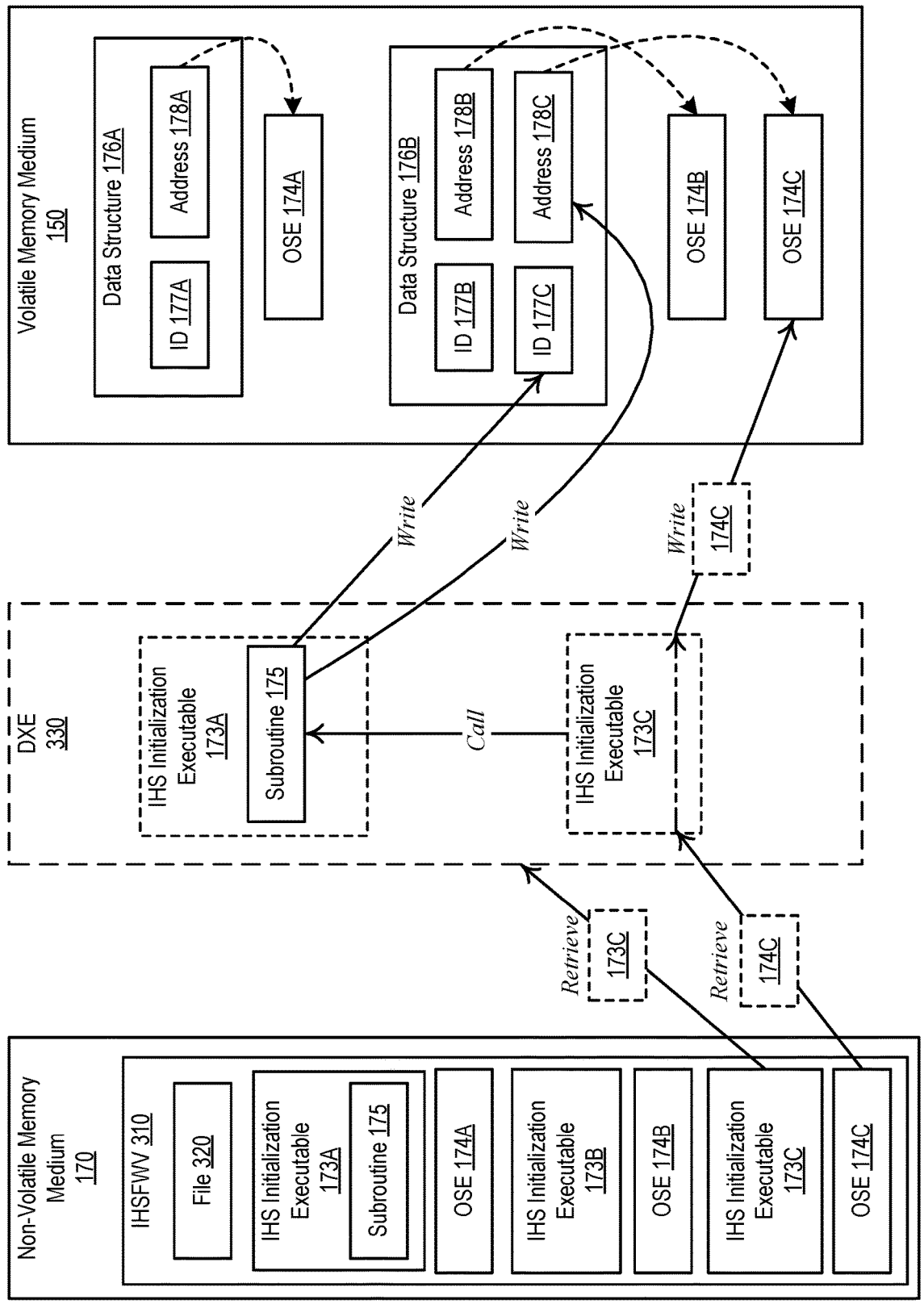
FIG. 3C illustrates an example of providing a third operating system executable to a volatile memory medium, according to one or more embodiments.

Turning now to FIG. 3C, an example of providing a third operating system executable to a volatile memory medium is illustrated, according to one or more embodiments. As shown, DXE 330 may retrieve IHS initialization executable 173C from non-volatile memory medium 170. For example, DXE 330 may retrieve IHS initialization executable 173C from IHSFWV 310. In one or more embodiments, a third IHS initialization executable/OS executable pair may include IHS initialization executable 173C and OS executable 174C. In one or more embodiments, processor 120 may execute IHS initialization executable 173C via DXE 330. For example, IHS initialization executable 173C may include a DXE driver.

As shown, OS executable 174C may be retrieved from non-volatile memory medium 170. For example, IHS initialization executable 173C may retrieve OS executable 174C from non-volatile memory medium 170. For instance, OS executable 174C may be retrieved from IHSFWV 310. As illustrated, IHS initialization executable 173C may write OS executable 174C to volatile memory medium 150. For example, IHS initialization executable 173C may write OS executable 174C to volatile memory medium 150 at an address 178C associated with volatile memory medium 150. For instance, address 178C may be an address of memory portion 152A.

As shown, IHS initialization executable 173C may call subroutine 175. In one or more embodiments, IHS initialization executable 173C may provide address 178C to subroutine 175. As illustrated, subroutine 175 may write ID 177C associated with OS executable 174C to data structure 176B. For example, subroutine 175 may store, via data structure 176B, ID 177C associated with OS executable 174C. As shown, subroutine 175 may write address 178C associated with OS executable 174C to data structure 176C. For example, subroutine 175 may store, via data structure 176B, address 178C associated with OS executable 174C.

Figure 3D:
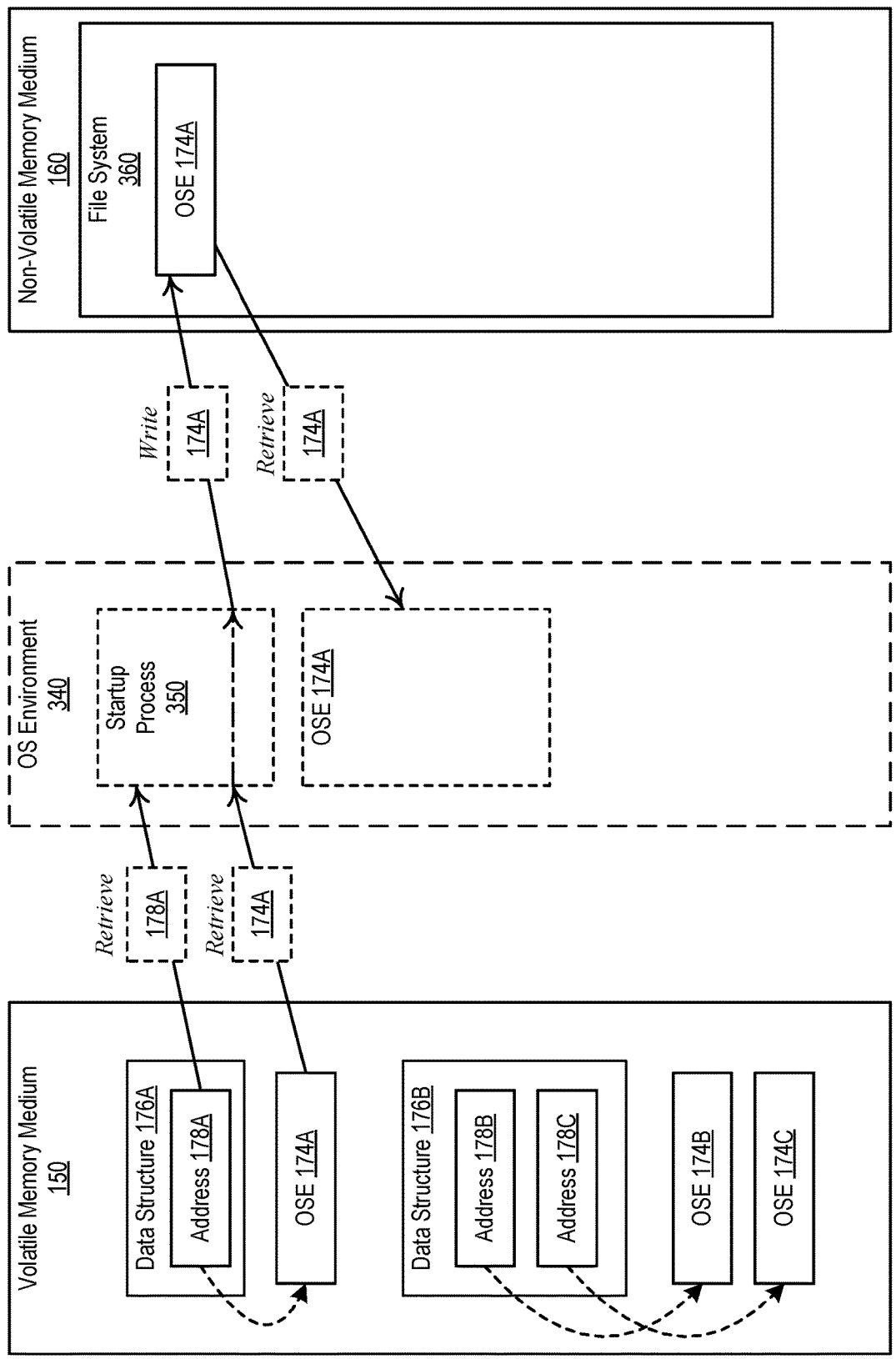
FIG. 3D illustrates an example of providing a first operating system executable to a non-volatile memory medium, according to one or more embodiments.

Turning now to FIG. 3D, an example of providing a first operating system executable to a non-volatile memory medium is illustrated, according to one or more embodiments. As shown, an OS environment 340 may include a startup process 350. In one or more embodiments, OS environment 340 may include OS 162 executed by processor 120. In one or more embodiments, startup process 350 may include a platform application controller. For example, startup process 350 may include one or more structures and/or one or more functionalities of a session manager. In one or more embodiments, the session manager may instruct the processor to execute one or more of OS executables 174A-174N.

As illustrated, startup process 350 may retrieve address 178A from data structure 176A. As shown, startup process 350 may retrieve OS executable 174A from volatile memory medium 150. For example, startup process 350 may retrieve OS executable 174A from volatile memory medium 150 based at least on address 178A. As illustrated, startup process 350 may write OS executable 174A to non-volatile memory medium 160. As shown, non-volatile memory medium 160 may include a file system 360. For example, startup process 350 may write OS executable 174A to file system 360.

In one or more embodiments, IHS initialization executable 173A may not be able to write OS executable 174A to file system 360. For example, IHS initialization executable 173A may not be configured to write OS executable 174A to file system 360. For instance, startup process 350 may copy OS executable 174A from volatile memory medium 150 to file system 360, since IHS initialization executable 173A may not be configured to write OS executable 174A to file system 360.

As illustrated, OS executable 174A may be retrieved from non-volatile memory medium 160. For example, OS executable 174A may be retrieved from file system 360. For example, startup process 350 may retrieve OS executable 174A from file system 360. In one or more embodiments, OS executable 174A may be executed via OS environment 340. For example, processor 120 may execute OS executable 174A via OS environment 340. In one or more embodiments, startup process 350 may instruct processor 120 to execute OS executable 174A. For example, startup process 350 may instruct processor 120 to execute OS executable 174A via OS environment 340.

Figure 3E:
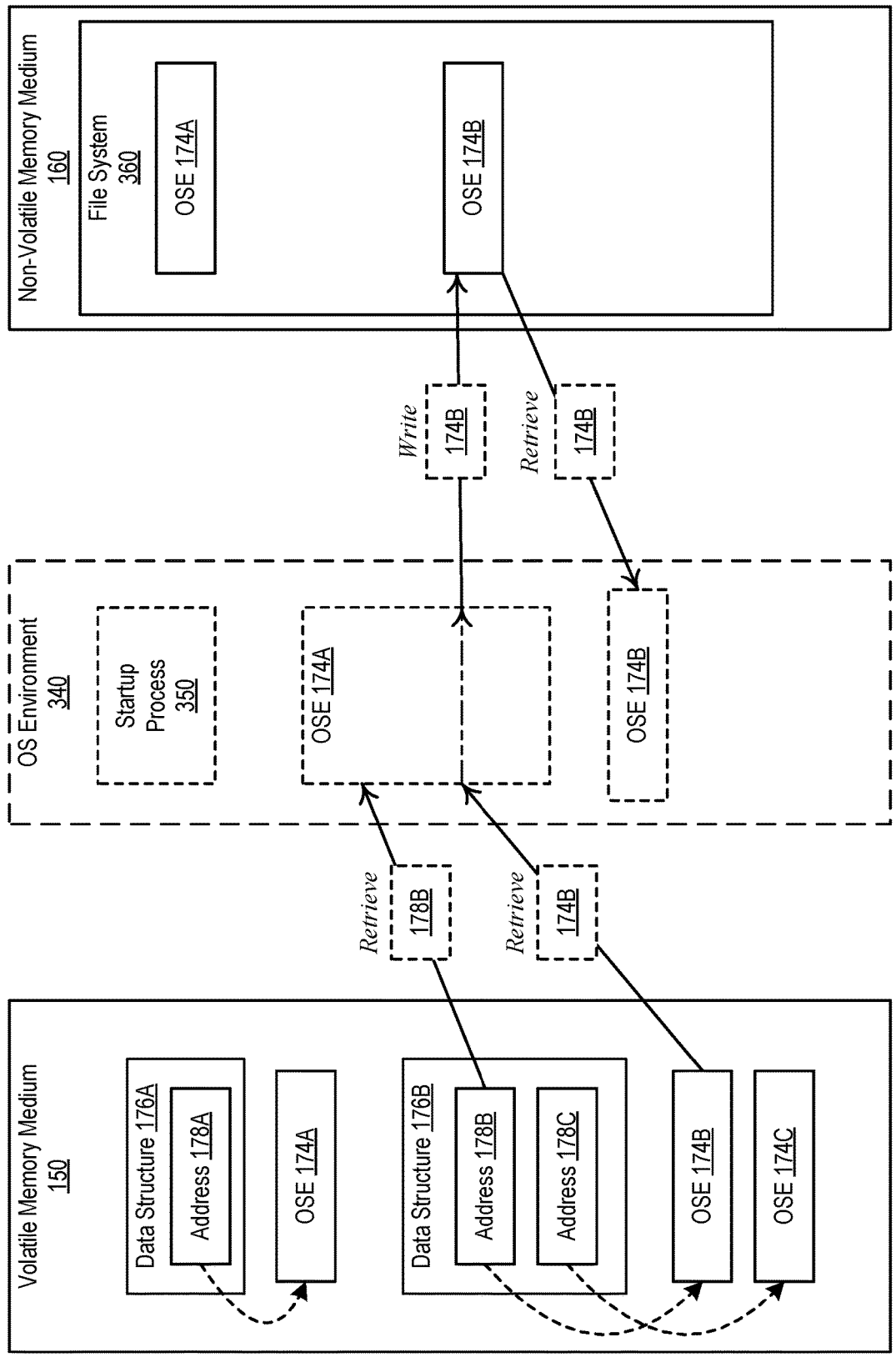
FIG. 3E illustrates an example of providing a second operating system executable to a non-volatile memory medium, according to one or more embodiments.

Turning now to FIG. 3E, an example of providing a second operating system executable to a non-volatile memory medium is illustrated, according to one or more embodiments. As shown, OS executable 174A may retrieve address 178B from data structure 176B. As illustrated, OS executable 174A may retrieve OS executable 174B from volatile memory medium 150. For example, OS executable 174A may retrieve OS executable 174B from volatile memory medium 150 based at least on address 178B. As shown, OS executable 174A may write to OS executable 174B non-volatile memory medium 160. For example, OS executable 174A may write OS executable 174B to file system 360.

In one or more embodiments, IHS initialization executable 173B may not be able to write OS executable 174B to file system 360. For example, IHS initialization executable 173B may not be configured to write OS executable 174B to file system 360. For instance, OS executable 174A may copy OS executable 174B from volatile memory medium 150 to file system 360, since IHS initialization executable 173B may not be configured to write OS executable 174B to file system 360.

As illustrated, OS executable 174B may be retrieved from non-volatile memory medium 160. For example, OS executable 174B may be retrieved from file system 360. For instance, OS executable 174A may retrieve OS executable 174B from file system 360. In one or more embodiments, OS executable 174B may be executed. For example, processor 120 may execute OS executable 174B via OS environment 340. In one instance, OS executable 174A may instruct processor 120 to execute OS executable 174B. In another instance, user input may instruct processor 120 to execute OS executable 174B.

Figure 3F:
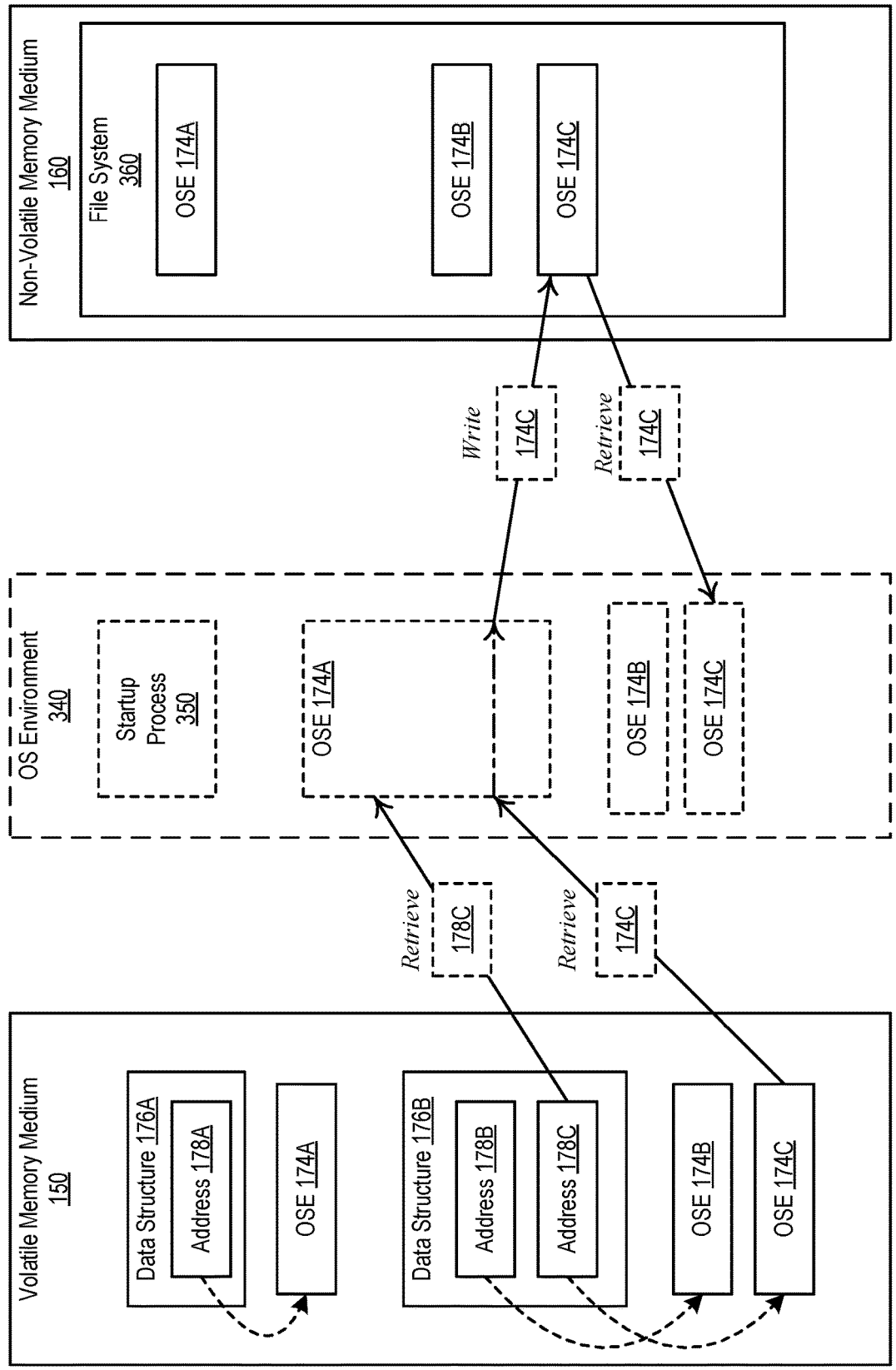
FIG. 3F illustrates an example of providing a third operating system executable to a non-volatile memory medium, according to one or more embodiments.

Turning now to FIG. 3F, an example of providing a third operating system executable to a non-volatile memory medium is illustrated, according to one or more embodiments. As shown, OS executable 174A may retrieve address 178C from data structure 176B. As illustrated, OS executable 174A may retrieve OS executable 174C from volatile memory medium 150. For example, OS executable 174A may retrieve OS executable 174C from volatile memory medium 150 based at least on address 178C. As shown, OS executable 174A may write to OS executable 174C non-volatile memory medium 160. For example, OS executable 174A may write OS executable 174C to file system 360.

In one or more embodiments, IHS initialization executable 173C may not be able to write OS executable 174C to file system 360. For example, IHS initialization executable 173C may not be configured to write OS executable 174C to file system 360. For instance, OS executable 174A may copy OS executable 174C from volatile memory medium 150 to file system 360, since IHS initialization executable 173C may not be configured to write OS executable 174C to file system 360.

As illustrated, OS executable 174C may be retrieved from non-volatile memory medium 160. For example, OS executable 174C may be retrieved from file system 360. For instance, OS executable 174A may retrieve OS executable 174C from file system 360. In one or more embodiments, OS executable 174C may be executed. For example, processor 120 may execute OS executable 174C via OS environment 340. In one instance, OS executable 174A may instruct processor 120 to execute OS executable 174C. In another instance, user input may instruct processor 120 to execute OS executable 174C.

Although the examples of FIGS. 3E and 3F illustrate OS executable 174A providing two operating system executables to a non-volatile memory medium, OS executable 174A may provide any number of operating system executables to the non-volatile memory medium, according to one or more embodiments. For example, OS executable 174A may access data structure 176B, where OS executable 174A may obtain addresses 178B-178N (as illustrated in FIG. 1C). For instance, OS executable 174A may provide operating system executables 174B-174N to non-volatile memory medium 160. As an example, OS executable 174A may copy operating system executables 174B-174N from volatile memory medium 150 to non-volatile memory medium 160.

Figure 4A:
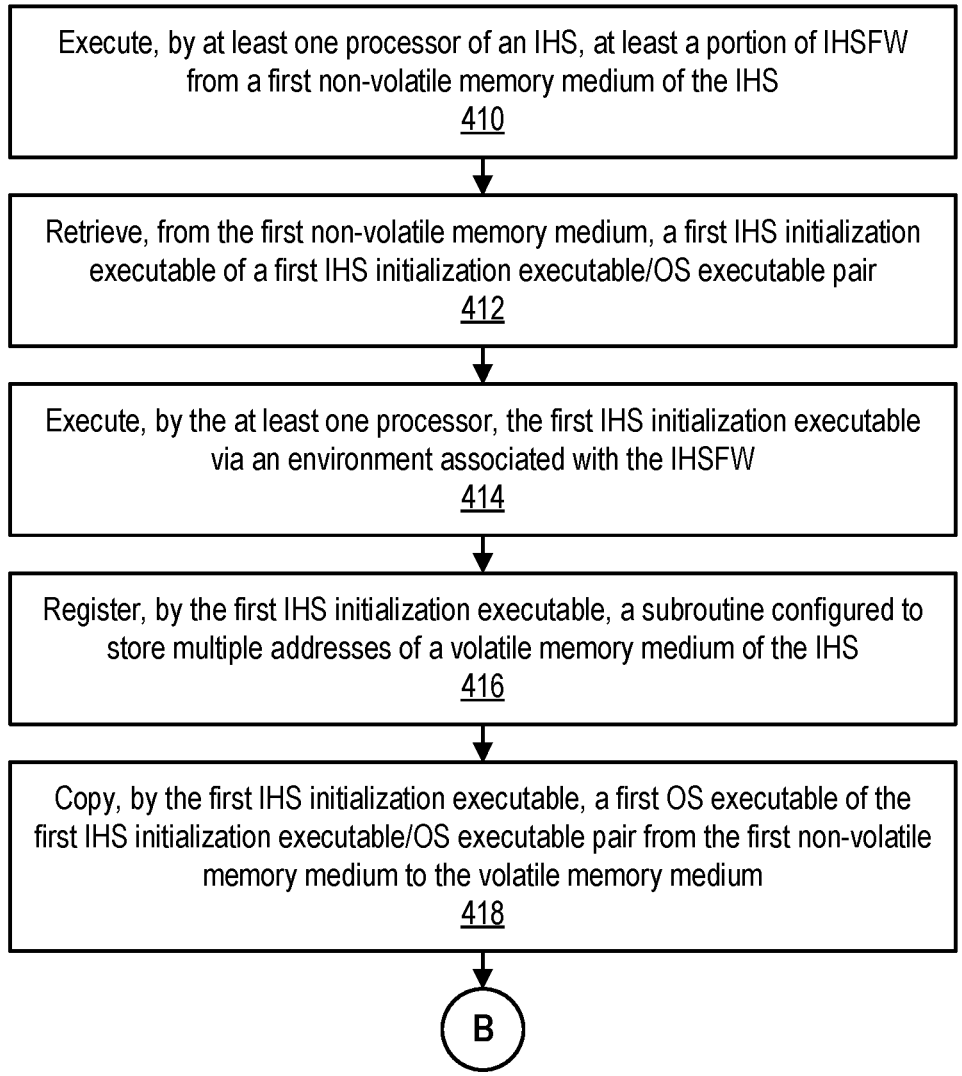
FIGS. 4A and 4B illustrate another example of a method of operating an information handling system, according to one or more embodiments.
Figure 4B:
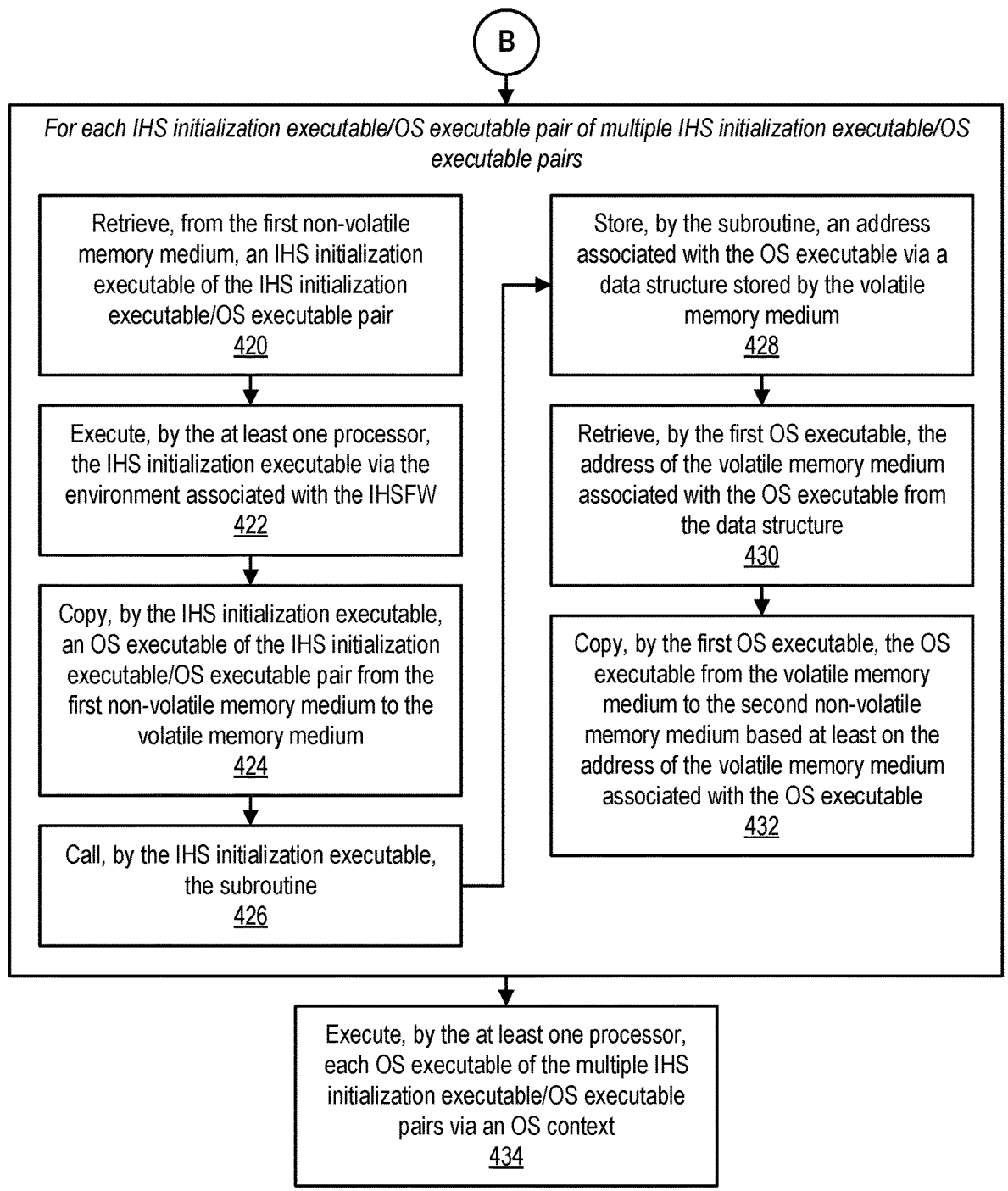

Turning now to FIGS. 4A and 4B, another example of a method of operating an information handling system is illustrated, according to one or more embodiments. At 410, at least one processor of an IHS may execute at least a portion of IHSFW from a first non-volatile memory medium of the IHS. For example, processor 120 may execute at least a portion of IHSFW 172 from non-volatile memory medium 170. At 412, a first IHS initialization executable of a first IHS initialization executable/OS executable pair may be retrieved from the first non-volatile memory medium. For example, IHS initialization executable 173A may be retrieved from non-volatile memory medium 170. For instance, processor 120 may retrieve executable 173A from non-volatile memory medium 170. In one or more embodiments, DXE 330 may retrieve executable 173A from non-volatile memory medium 170. In one or more embodiments, the first IHS initialization executable/OS executable pair may include IHS initialization executable 173A and OS executable 174A.

At 414, the at least one processor may execute the first IHS initialization executable via an environment associated with the IHSFW. For example, processor 120 may execute IHS initialization executable 173A via an environment associated with IHSFW 172. For instance, the environment associated with IHSFW 172 may include DXE 330. At 416, the first IHS initialization executable may register a subroutine configured to store multiple addresses of a volatile memory medium of the IHS. For example, IHS initialization executable 173A may register subroutine 175, configured to store multiple addresses of volatile memory medium 150.

At 418, the first IHS initialization executable may copy a first OS executable of the first IHS initialization executable/OS executable pair from the first non-volatile memory medium to the volatile memory medium. For example, IHS initialization executable 173A may copy OS executable 174A from non-volatile memory medium 170 to volatile memory medium 150. In one or more embodiments, copying the first OS executable from the first non-volatile memory medium to the volatile memory medium may include retrieving the first OS executable from the volatile memory medium. For example, IHS initialization executable 173A may retrieve OS executable 174A from non-volatile memory medium 170. In one or more embodiments, copying the first OS executable from the first non-volatile memory medium to the volatile memory medium may include writing the first OS executable to the volatile memory medium. For example, IHS initialization executable 173A may write OS executable 174A to volatile memory medium 150.

In one or more embodiments, method elements 420-432 may be performed for each IHS initialization executable/OS executable pair of multiple IHS initialization executable/OS executable pairs. For example, method elements 420-432 may be performed for each IHS initialization executable/OS executable pair of the multiple IHS initialization executable/OS executable pairs 173B/174B-173N/174N.

At 420, an IHS initialization executable of the IHS initialization executable/OS executable pair may be retrieved from the first non-volatile memory medium. For example, an IHS initialization executable 173 of IHS initialization executables 173B-173N may be retrieved from non-volatile memory medium 170. In one instance, IHS initialization executable 173B of IHS initialization executable 173B/OS executable 174B pair may be retrieved from non-volatile memory medium 170. In another instance, IHS initialization executable 173C of IHS initialization executable 173C/OS executable 174C pair may be retrieved from non-volatile memory medium 170.

At 422, the at least one processor may execute the IHS initialization executable via the environment associated with the IHSFW. For example, processor 120 may execute IHS initialization executable 173 of IHS initialization executables 173B-173N via the environment associated with IHSFW 172. In one instance, processor 120 may execute IHS initialization executable 173B via the environment associated with IHSFW 172. In another instance, processor 120 may execute IHS initialization executable 173C via the environment associated with IHSFW 172. In one or more embodiments, the environment associated with IHSFW 172 may include DXE 330.

At 424, the IHS initialization executable may copy an OS executable of the IHS initialization executable/OS executable pair from the first non-volatile memory medium to the volatile memory medium. For example, IHS initialization executable 173 of IHS initialization executables 173B-173N may copy an OS executable 174 of OS executables 174B-174N from non-volatile memory medium 170 to volatile memory medium 150. In one instance, IHS initialization executable 173B may copy OS executable 174B from non-volatile memory medium 170 to volatile memory medium 150. In another instance, IHS initialization executable 173C may copy OS executable 174C from non-volatile memory medium 170 to volatile memory medium 150. In one or more embodiments, copying the OS executable of the IHS initialization executable/OS executable pair from the first non-volatile memory medium to the volatile memory medium may include retrieving the OS executable of the IHS initialization executable/OS executable pair from the first non-volatile memory medium. In one or more embodiments, copying the OS executable of the IHS initialization executable/OS executable pair from the first non-volatile memory medium to the volatile memory medium may include writing the OS executable of the IHS initialization executable/OS executable pair to the volatile memory medium.

At 426, the IHS initialization executable may call the subroutine. For example, IHS initialization executable 173 of IHS initialization executables 173B-173N may call subroutine 175. In one instance, IHS initialization executable 173B may call subroutine 175, as illustrated in FIG. 3B. In another instance, IHS initialization executable 173C may call subroutine 175, as illustrated in FIG. 3C.

At 428, the subroutine may store an address associated with the OS executable via a data structure stored by the volatile memory medium. For example, subroutine 175 may store an address associated with OS executable 174 of OS executables 174B-174N via data structure 176B. In one instance, subroutine 175 may store an address associated with OS executable 174B via data structure 176B. In another instance, subroutine 175 may store an address associated with OS executable 174C via data structure 176B.

At 430, the first OS executable may retrieve the address of the volatile memory medium associated with the OS executable from the data structure. For example, OS executable 174A may retrieve the address of volatile memory medium 150 associated with OS executable 174 of OS executable 174B-174N from data structure 176B. In one instance, OS executable 174A may retrieve address 178B of volatile memory medium 150 associated with OS executable 174B from data structure 176B. In another instance, OS executable 174A may retrieve address 178C of volatile memory medium 150 associated with OS executable 174C from data structure 176B.

At 432, the first OS executable may copy the OS executable from the volatile memory medium to the second non-volatile memory medium based at least on the address of the volatile memory medium associated with the OS executable. For example, OS executable 174A may copy OS executable 174 of OS executable 174B-174N from volatile memory medium 150 to non-volatile memory medium 160 based at least on address 178 associated with OS executable 174 of OS executable 174B-174N. In one instance, OS executable 174A may copy OS executable 174B from volatile memory medium 150 to non-volatile memory medium 160 based at least on address 178B associated with OS executable 174B. In another instance, OS executable 174A may copy OS executable 174C from volatile memory medium 150 to non-volatile memory medium 160 based at least on address 178C associated with OS executable 174C. In one or more embodiments, copying the OS executable from the volatile memory medium to the second non-volatile memory medium based at least on the address of the volatile memory medium associated with the OS executable may include retrieving the OS executable from the volatile memory medium based at least on the address of the volatile memory medium associated with the OS executable. In one or more embodiments, copying the OS executable from the volatile memory medium to the second non-volatile memory medium based at least on the address of the volatile memory medium associated with the OS executable may include writing the OS executable to the second non-volatile memory medium.

At 434, the at least one processor may execute each OS executable of the multiple IHS initialization executable/OS executable pairs via an OS context. For example, processor 120 may execute each OS executable 174 of the multiple IHS initialization executable/OS executable pairs 173B/174B-173N/174N via an OS context. In one or more embodiments, the OS context may include an OS environment. For example, the OS context may include an OS environment (e.g., OS environment 340) of OS 162.

In one or more embodiments, before executing the at least the portion of IHSFW at 410, OS 162 may be installed or reinstalled on the second non-volatile memory medium (e.g., non-volatile memory medium 160), or another operating system, different from OS 162, may be installed on the second non-volatile memory medium. In one example, this may enable each OS executable of the multiple of IHS initialization executable/OS executable pairs to endure on the second non-volatile memory medium. In another example, this may enable each OS executable of the multiple of IHS initialization executable/OS executable pairs to have continuity on the second non-volatile memory medium. In one or more embodiments, each OS executable of the multiple IHS initialization executable/OS executable pairs may endure on the second non-volatile memory medium after another operating system, different from the operating system, has been installed on the second non-volatile memory medium.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
at least one processor; and
a memory medium, coupled to the at least one processor, that stores instructions executable by the at least one processor, which when executed by the at least one processor, cause the information handling system (IHS) to:
register, by a first IHS initialization executable of a first IHS initialization executable/operating system (OS) executable pair that is executed via an environment associated with IHS firmware, a subroutine configured to store a plurality of addresses of a volatile memory medium of the IHS;
for each IHS initialization executable/OS executable pair of a plurality of IHS initialization executable/OS executable pairs:
retrieve, from a first non-volatile memory medium of the IHS, an IHS initialization executable of the IHS initialization executable/OS executable pair;
execute, by the at least one processor, the IHS initialization executable via an environment associated with IHS firmware;
copy, by the IHS initialization executable, an OS executable of the IHS initialization executable/OS executable pair from the first non-volatile memory medium to the volatile memory medium;
call, by the IHS initialization executable, the subroutine;
store, by the subroutine, an address of the volatile memory medium associated with the OS executable via a data structure stored by the volatile memory medium;
retrieve, by a first OS executable of the first IHS initialization executable/OS executable pair, the address of the volatile memory medium associated with the OS executable from the data structure; and
copy, by the first OS executable, the OS executable from the volatile memory medium to a second non-volatile memory medium of the IHS based at least on the address of the volatile memory medium associated with the OS executable; and
execute, by the at least one processor, each OS executable of the plurality of IHS initialization executable/OS executable pairs via an OS context of an operating system.

2. The information handling system of claim 1, wherein each OS executable of the plurality of IHS initialization executable/OS executable pairs endures on the second non-volatile memory medium after another operating system, different from the operating system, has been installed on the second non-volatile memory medium.

3. The information handling system of claim 1,
wherein the environment associated with the IHS firmware includes a driver execution environment (DXE);
wherein a first DXE driver includes the first IHS initialization executable; and
wherein each of a plurality of DXE drivers includes a respective IHS initialization executable of the plurality of IHS initialization executable/OS executable pairs.

4. The information handling system of claim 1,
wherein the first non-volatile memory medium stores an IHS firmware volume; and
wherein the IHS firmware volume stores the first IHS initialization executable/OS executable pair and the plurality of IHS initialization executable/OS executable pairs.

5. The information handling system of claim 1, wherein the first non-volatile memory medium includes a serial interface flash memory device.

6. The information handling system of claim 1, wherein the data structure includes a table that is compliant with an Advanced Configuration and Power Interface (ACPI) table.

7. The information handling system of claim 6, wherein the instructions further cause the information handling system to:
register the table with an ACPI service.

8. A method, comprising:
registering, by a first information handling system (IHS) initialization executable of a first IHS initialization executable/operating system (OS) executable pair that is executed via an environment associated with IHS firmware, a subroutine configured to store a plurality of addresses of a volatile memory medium of an IHS;
for each IHS initialization executable/OS executable pair of a plurality of IHS initialization executable/OS executable pairs:
retrieving, from a first non-volatile memory medium of the IHS, an IHS initialization executable of the IHS initialization executable/OS executable pair;
executing, by at least one processor of the IHS, the IHS initialization executable via the environment associated with the IHS firmware;
copying, by the IHS initialization executable, an OS executable of the IHS initialization executable/OS executable pair from the first non-volatile memory medium to the volatile memory medium;
calling, by the IHS initialization executable, the subroutine;
storing, by the subroutine, an address of the volatile memory medium associated with the OS executable via a data structure stored by the volatile memory medium;
retrieving, by a first OS executable of the first IHS initialization executable/ OS executable pair, the address of the volatile memory medium associated with the OS executable from the data structure; and
copying, by the first OS executable, the OS executable from the volatile memory medium to a second non-volatile memory medium of the IHS based at least on the address of the volatile memory medium associated with the OS executable; and
executing, by the at least one processor, each OS executable of the plurality of IHS initialization executable/OS executable pairs via an OS context of an operating system.

9. The method of claim 8, wherein each OS executable of the plurality of IHS initialization executable/OS executable pairs endures on the second non-volatile memory medium after another operating system, different from the operating system, has been installed on the second non-volatile memory medium.

10. The method of claim 8,
wherein the environment associated with the IHS firmware includes a driver execution environment (DXE);
wherein a first DXE driver includes the first IHS initialization executable; and
wherein each of a plurality of DXE drivers includes a respective IHS initialization executable of the plurality of IHS initialization executable/OS executable pairs.

11. The method of claim 8,
wherein the first non-volatile memory medium stores an IHS firmware volume; and
wherein the IHS firmware volume stores the first IHS initialization executable/OS executable pair and the plurality of IHS initialization executable/OS executable pairs.

12. The method of claim 8, wherein the first non-volatile memory medium includes a serial interface flash memory device.

13. The method of claim 8, wherein the data structure includes a table that is compliant with an Advanced Configuration and Power Interface (ACPI) table.

14. The method of claim 13, further comprising:
registering the table with an ACPI service.

15. A computer-readable non-transitory memory medium that includes instructions that, when executed by at least one processor of an information handling system, cause the information handling system (IHS) to:
register, by a first IHS initialization executable of a first IHS initialization executable/operating system (OS) executable pair that is executed via an environment associated with IHS firmware, a subroutine configured to store a plurality of addresses of a volatile memory medium of the IHS;
for each IHS initialization executable/OS executable pair of a plurality of IHS initialization executable/OS executable pairs:
retrieve, from a first non-volatile memory medium of the IHS, an IHS initialization executable of the IHS initialization executable/OS executable pair;
execute, by the at least one processor, the IHS initialization executable via the environment associated with the IHSFW;
copy, by the IHS initialization executable, an OS executable of the IHS initialization executable/OS executable pair from the first non-volatile memory medium to the volatile memory medium;
call, by the IHS initialization executable, the subroutine;
store, by the subroutine, an address of the volatile memory medium associated with the OS executable via a data structure stored by the volatile memory medium;
retrieve, by a first OS executable of the first IHS initialization executable/ OS executable pair, the address of the volatile memory medium associated with the OS executable from the data structure; and
copy, by the first OS executable, the OS executable from the volatile memory medium to a second non-volatile memory medium of the IHS based at least on the address of the volatile memory medium associated with the OS executable; and
execute, by the at least one processor, each OS executable of the plurality of IHS initialization executable/OS executable pairs via an OS context of an operating system.

16. The computer-readable non-transitory memory medium of claim 15, wherein each OS executable of the plurality of IHS initialization executable/OS executable pairs endures on the second non-volatile memory medium after another operating system, different from the operating system, has been installed on the second non-volatile memory medium.

17. The computer-readable non-transitory memory medium of claim 15,
wherein the environment associated with the IHS firmware includes a driver execution environment (DXE);
wherein a first DXE driver includes the first IHS initialization executable; and
wherein each of a plurality of DXE drivers includes a respective IHS initialization executable of the plurality of IHS initialization executable/OS executable pairs.

18. The computer-readable non-transitory memory medium of claim 15, wherein the first non-volatile memory medium includes a serial interface flash memory device.

19. The computer-readable non-transitory memory medium of claim 15, wherein the data structure includes a table that is compliant with an Advanced Configuration and Power Interface (ACPI) table.

20. The computer-readable non-transitory memory medium of claim 19, wherein the instructions further cause the information handling system to:
register the table with an ACPI service.

* * * * *